United States Patent
Rathgeb et al.

(10) Patent No.: US 12,360,521 B2
(45) Date of Patent: Jul. 15, 2025

(54) COMPUTER-IMPLEMENTED METHOD FOR PROVIDING DATA, IN PARTICULAR FOR CONFORMITY TRACKING

(71) Applicant: Siemens Energy Global GmbH & Co. KG, Munich (DE)

(72) Inventors: Andreas Rathgeb, Poxdorf (DE); Manish Udas, Steinheim am Albuch (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 1037 days.

(21) Appl. No.: 16/982,823

(22) PCT Filed: Feb. 28, 2019

(86) PCT No.: PCT/EP2019/054967
§ 371 (c)(1),
(2) Date: Sep. 21, 2020

(87) PCT Pub. No.: WO2019/179744
PCT Pub. Date: Sep. 26, 2019

(65) Prior Publication Data
US 2021/0055718 A1 Feb. 25, 2021

(30) Foreign Application Priority Data
Mar. 23, 2018 (EP) .................................... 18163632

(51) Int. Cl.
*G05B 23/02* (2006.01)
*G05B 19/042* (2006.01)
(52) U.S. Cl.
CPC ..... *G05B 23/0256* (2013.01); *G05B 19/0425* (2013.01)
(58) Field of Classification Search
CPC .......................... G05B 23/0256; G05B 19/0425
See application file for complete search history.

(56) References Cited

U.S. PATENT DOCUMENTS

| | | | | |
|---|---|---|---|---|
| 6,397,378 | B1* | 5/2002 | Grey | G06F 11/3688 717/175 |
| 9,934,138 | B1* | 4/2018 | Bache | G06F 11/3688 |

(Continued)

FOREIGN PATENT DOCUMENTS

| | | |
|---|---|---|
| CA | 2327908 A1 | 6/2002 |
| CN | 101346724 A | 1/2009 |

(Continued)

OTHER PUBLICATIONS

Anderson Ross: "Security Engineering. A Guide to Building Dependable Distributed Systems"; Wiley; Jan. 2001; 2001.

(Continued)

*Primary Examiner* — Mohamed Charioui
*Assistant Examiner* — Christine Y Liao
(74) *Attorney, Agent, or Firm* — Schmeiser, Olsen & Watts, LLP

(57) ABSTRACT

Provided is a computer-implemented method for providing data, in particular for conformity tracking, in a distributed peer-to-peer network, having the steps of: —providing at least one first data block having data representative of the conformity tracking, for generating a blockchain having a first checksum by a first entity of the peer-to-peer network, —providing at least one piece of proof-of-authority evidence for verifying a further data block, —generating the further data block representative of conformity tracking having a further checksum and at least the first checksum by a further entity of the peer-to-peer network, —checking the proof-of-authority evidence, —adding the further data block to the first data block in the event of a successful check on the proof-of-authority evidence in order to form the blockchain, and—providing the blockchain in the distributed peer-to-peer network, wherein one of the data blocks is in the form of a smart contract.

15 Claims, 10 Drawing Sheets

(56) References Cited

U.S. PATENT DOCUMENTS

| | | | | |
|---|---|---|---|---|
| 2004/0143830 | A1* | 7/2004 | Gupton | G06F 8/61 717/106 |
| 2011/0254731 | A1 | 10/2011 | Musmeci | |
| 2014/0084165 | A1 | 3/2014 | Mittleman et al. | |
| 2016/0098647 | A1 | 4/2016 | Rotvold et al. | |
| 2016/0253622 | A1 | 9/2016 | Sriram | |
| 2017/0232300 | A1 | 8/2017 | Tran | |
| 2017/0237569 | A1 | 8/2017 | Vandervort | |
| 2017/0310653 | A1 | 10/2017 | Zhang | |
| 2017/0352012 | A1* | 12/2017 | Hearn | H04L 9/3247 |
| 2018/0176084 | A1* | 6/2018 | McNab | H04L 67/10 |
| 2020/0192335 | A1 | 6/2020 | Takao | |

FOREIGN PATENT DOCUMENTS

| | | | |
|---|---|---|---|
| CN | 102326091 | A | 1/2012 |
| CN | 105282545 | A | 1/2016 |
| CN | 105306309 | A | 2/2016 |
| CN | 105865801 | A | 8/2016 |
| CN | 107306183 | A | 10/2017 |
| CN | 107431622 | A | 12/2017 |
| DE | 102017121296 | A1 | 3/2018 |
| EP | 2037340 | A1 | 3/2009 |
| EP | 2437191 | A2 | 4/2012 |
| JP | 2000259222 | A | 9/2000 |
| JP | 2016076218 | A | 5/2016 |
| JP | 2017191612 | A | 10/2017 |
| JP | 2018173794 | A | 11/2018 |
| WO | WO 2016151708 | A1 | 9/2016 |

OTHER PUBLICATIONS

Needham Roger M et al: "Using encryption for authentication in large networks of computers", ACM: Communications of the ACM, vol. 21, No. 12, Dec. 1978; 1978.
Goranovic Andrija et al: "Blockchain applications in microgrids an overview of current projects and concepts", IECON 2017—43rd Annual Conference of the IEEE Industrial Electronics Society, IEEE, pp. 6153-6158, XP033280449, DOI: 10.1109/IECON.2017.8217069, gefunden am Dec. 15, 2017, the whole document; 2017.
DIN EN 61508-1 VDE 0803-1 Funktionale Sicherheit sicherheitsbezogener elektrischer/elektronischer/programmierbarer elektronischer Systeme—Teil 1: Allgemeine Anforderungen, (IEC 61508-1:2010); German Version EN 61508-1:2010 DKE Deutsche Kommission Elektrotechnik Elektronik Informationstechnik im DIN und VDE; 2011.
Antonopoulos Andreas M: "Mastering Bitcoin: Unlocking Digital Cryptocurrencies" O'Reilly, First edition discloses at section Transaction Age, Fees, and Priority; 2010.
Chalaemwongwan Nutthakorn et al: "State of the art and challenges facing consensus protocols on blockchain", 2018 International Conference on Information Networking (ICOIN), IEEE, pp. 957-962, XP033334708, DOI: 10.1109/ICOIN.2018.8343266, gefunden am Apr. 19, 2018, the whole document; 2018.
GitHub/ "The Ethereum Book Project/Mastering Ethereum" https://github.com/ethereumbook/ethereumbook, Stand 5.10.2017; 2017.
Diedrich, Henning "Ethereum: Blockchains, Digital Assets, Smart Contracts, Decentralized Autonomous Organizations" CreateSpace Independent Publishing Platform, 8. Sep. 2016 // ISBN-10: 1523930470 // ISBN-13: 978-1523930470.
Baird Leemon: "The Swirlds Hashgraph Consensus Algorithm: Fair, Fast, Byzantine Fault Tolerance", Swirlds Tech Report SWIRLDS-TR-2016-01; 2016.
Blockchainhub: "Blockchain Oracles", https://blockchainhub.net/blockchain-oracles/; 2018.
Dinh Tien Tuan Anh et al: "Untangling Blockchain: A Data Processing View of Blockchain Systems", XP055482191, gefunden im Internet: URL:https://arxiv.org/pdf/1708.05665.pdf, gefunden am Jun. 7, 2018, pp. 1-11; 2017.
Baird Leemon: "Overview of Swirlds Hashgraph", Swirlds; 2016.
PCT International Search Report and Written Opinion of International Searching Authority mailed(May 23, 2019 corresponding to PCT International Application No. PCT/EP2019/054967 filed Feb. 28, 2019.
Jing-Shu et al., Abnormal Detection of Eclipse Attacks on Block chain Based on Immunity, DOI 10.11896/j.issn.1002-137X. 2018. 02. 002, vol. 45, Computer Science, No. 2, Feb. 2018, 7 pages.

* cited by examiner

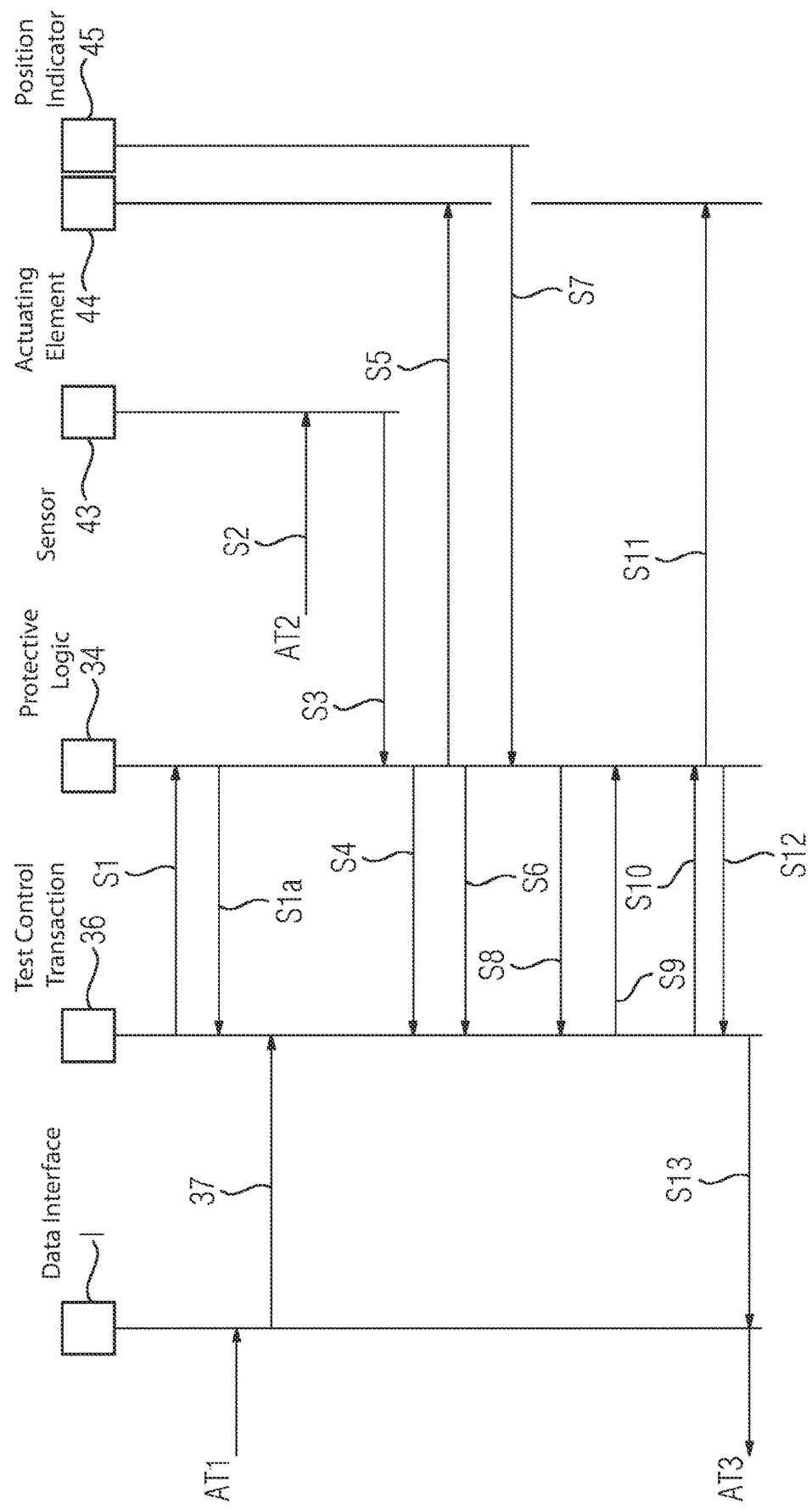

COMPUTER-IMPLEMENTED METHOD FOR PROVIDING DATA, IN PARTICULAR FOR CONFORMITY TRACKING

CROSS-REFERENCE TO RELATED APPLICATIONS

This application claims priority to PCT Application No. PCT/EP2019/054967, having a filing date of Feb. 28, 2019, which is based on EP Application No. 18163632.5, having a filing date of Mar. 23, 2018, the entire contents both of which are hereby incorporated by reference.

FIELD OF TECHNOLOGY

The following relates to a computer-implemented method for providing data, in particular for conformity tracking.

BACKGROUND

Products and systems may come with a hazard potential and are then subject to guidelines, regulations and laws, compliance with which is monitored by official authorities and so-called notified bodies. This monitoring may concern the design, manufacture, documentation, assembly, start-up, operation and disposal or disassembly, that is to say the entire life-cycle of the system or product.

The legislator prescribes for this a testing and certifying process, which is carried out by conformity assessment bodies of appropriate competence.

Depending on the sector, plant, system or product, areas or parts that are relevant to monitoring are identified in the course of design or planning and the applicable requirements from standards, guidelines, regulations and laws are stated.

Basic and detailed design are correspondingly performed, documented, tested and approved for implementation.

During and after completion of the building phase, the technical system/product prototype realized is checked against the approved planning and, in accordance with the result of the check, is approved for start-up or initial launch (declaration of conformity, operating permit).

To maintain compliant operation, where required, recurrent or random checks are carried out (for example on plant or product safety) and documented. Similarly, properly performed disassembly and evidence of disposal at the end of the lifetime are necessary and correspondingly documented.

In the case of process plants, for each phase of the system lifetime there is for example documentation of the respective phase.

This procedure is the responsibility of the manufacturer or operator and their representatives.

Loss of this documentation or parts of the documentation may lead to withdraw of the operating permit, recalls, new construction, shutting down of the plant and consequently great losses. Non-compliance with guidelines and laws may possibly also result in prison sentences.

The documentation of compliance with all laws and guidelines, with the associated inspection certificates, is at the present time an extensive and complex task, which involves at least three participants (manufacturer, inspector, operator) and numerous qualified persons. The documentation must be archived for many decades, but also be updated in order to be available at any time, for example in the case of an audit or an industrial accident. All analyses of causes, corrective measures and in particular questions of liability must include the up-to-date information contained here.

Up to the present time, evidence and documentation have been provided by manual, paper-based processes. The paper documentation produced, with inspection stamps and initials, is extensive, complex, slow and inflexible.

The use of physical stamps for the approval of documents is inadequate, not immune to falsification and cannot be automated.

The acceptance testing of for example failsafe controls, which already provide digital checksums in the verified digital systems, takes place on the basis of paper documentation.

The use of traditional document formats prevents automation and makes it necessary to process relatively great units. A flexible, granular and modular processing of subsystems or the exchange of individual products of a larger system always requires inspection of larger systems, involving corresponding effort.

The production of multiple originals is laborious in terms of distribution and archiving, requiring a great administrative effort over many decades.

SUMMARY

An aspect relates to a computer-implemented method for providing data, in particular for conformity tracking, in a distributed peer-to-peer network, having the steps of:
  providing at least one first data block, in particular having data representative of the conformity tracking, for generating a blockchain having a first checksum by a first entity of the peer-to-peer network,
  providing at least one proof-of-authority verification for verifying a further data block,
  generating the further data block representative of conformity tracking having a further checksum and at least the first checksum by a further entity of the peer-to-peer network,
  checking the proof-of-authority verification,
  adding the further data block to the first data block in the event of a successful check on the proof-of-authority verification in order to form the blockchain, and
  providing the blockchain in the distributed peer-to-peer network,
  wherein one of the data blocks takes the form of a smart contract that responds to the presence of a predetermined case of error by providing an error handling measure and/or responds to the presence of a test trigger signal by triggering a functional test.

The entities may be assigned to various participants, such as for example a supplier, a plant builder, a quality manager and a notifying agent. The first entity is the entity that starts a blockchain by forming a first data block. By contrast with legitimation by proof of work, the use of proof-of-authority verifications allows the required computing power to be reduced, and it is at the same time possible to update the blockchain by adding new data blocks more quickly in comparison. In this case, a proof-of-authority verification gives an entity the competence to validate transactions (for example by so-called validators) and combine them in blocks. The proof-of-authority verifications may be provided by the first entity. Alternatively or additionally, it may however also be provided that the further entities can provide proof-of-authority verifications.

The checking of the proof-of-authority verification in this case comprises transmitting the data block added to the blockchain together with the proof-of-authority verification to the other entities, which check the proof-of-authority verification and, if the check is successful, issue an approval to add the data block to the blockchain. A criterion may be specified for the approval, for example that half of the entities issue an approval.

The following advantages are achieved by the method according to embodiments of the invention:
1. Unforgeability: the implicit unforgeability on account of the architecture of the blockchain allows the digitization of certification stamps.
2. Quality: human errors are minimized on account of the transfer of working procedures into digital processes and their automation.
3. Integrity in cooperation: a high level of trust between the acting participants is produced by the high level of access authorization and with respect to the unforgeability of the stored data.
4. Availability and speed of access to data:
digitization in a distributed, automatically replicated database achieves a previously unattainable speed for these data.
5. Transparency and auditability: the structuring and modularizing of the data in digital processes allows better understanding with respect to content and sequence. Auditability is simplified and the investment risk is calculable and reduced. Insurance premiums of the operator fall.
6. Expedition: planning, construction and start-up can be expedited considerably, there is no need for sending documents or performing on-site acceptance tests. The instigation of measures to maintain production is directly possible.
7. Reduction of effort and cost: automation within the blockchain offers an additional increase in efficiency in the workflows for all parties.

Furthermore, because the basic certification procedure (checking the data by an inspector or a notified body) is being retained and because of high-quality authentication, the effect of an attack on the man-machine interface are well recognized and consequently limited.

Complete digitization now also allows data not of a document-like form to be exchanged between the participants. This means that data formats of proprietary software can be exchanged and for example provided for test purposes. For example, the created program of a failsafe control may be transmitted as a proprietary Simatic file, including the associated checksum, to the TUV German technical inspection agency, which can then check this file for errors, for example in a test simulation, without publishing its test mechanisms and tools. This increases the quality of the testing, and consequently also plant safety.

The acceptance and use of manufacturer-neutral data formats allows this function to be simplified considerably.

In addition, traditional documentation in the form of PDF documents or the like can also be registered in the blockchain, so that traditional paper documentation can be produced from the blockchain, for example when there are relevant milestones (design freeze, acceptance of construction work, provisional takeover, etc.)

In this case, smart contracts are understood as meaning contracts on a software basis in which a wide variety of contract terms and conditions can be stored. During the course of the contract, certain linked actions (for example payments) can be performed automatically when there is a corresponding trigger (for example fulfillment of contract terms and conditions). Thus, for example, the blockchain may be used for providing error handling measures. If an error occurs in the case of a component of a plant, such as for example a field device, the corresponding error signal triggers the data block formed as a smart contract, so that then a corresponding measure for error handling, such as deactivation of the defective field device and notification of exchange, is implemented.

For a transparent and globally accepted application of the described technology, smart contracts can as far as possible be published as an open-source source code. Publication (git-hub) serves for the inspection, testing and improvement of the technology, and consequently also the safety of products and systems. Providing the source code including the associated checksum of the compiled smart contract makes it possible at any time for the use of the smart contracts in a blockchain to be verified by the users, so that disputes can be reduced.

The following advantages are achieved:
1. New automated protective effect: the linkage of the current conformity status on-line in the blockchain allows new autonomous protective effects in the operation of the plant (for example suggestion of shutting down the plant) to be triggered, also including management aspects of safety.
2. Self documentation: integration of product-specific smart contracts allows properties directed at safety to be documented and tested in planning and implementation (for example in configuration management according to safety integrity level SIL).
3. New services in the area of plant safety and conformity: the technology makes possible new digital services in the area of product and system safety that can be realized with this platform.

According to one embodiment, the test trigger signal calls for a test signal. In other words, the smart contract has the effect that a test signal is generated within a predetermined time period. Test triggering is thus automated.

According to a further embodiment, a test signal is provided by the smart contract. Therefore, the test signal is generated by the smart contract itself. There is therefore no need for any further intervention, in order for example to trigger a test signal manually. Rather, the test signal is generated automatically.

According to a further embodiment, the smart contract provides a reset signal. This achieves the effect that, in response to a successful test, the system is reset to a state that corresponds to the state before the test.

According to a further embodiment, smart contract provides a feedback signal. Consequently, the blockchain is updated by the feedback signal and the successfully passed test is archived and publicized.

According to a further embodiment, the peer-to-peer network is a private network. Consequently, the blockchain is a federated blockchain or consortium blockchain, that is to say a non-public blockchain.

According to a further embodiment, the proof-of-authority verification has at least a time-limited validity period. In this case, time-limited validity is understood as meaning that the proof-of-authority verifications have an expiry date and, after the expiry date has passed, can no longer enable one of the further entities to add further data blocks to the blockchain. It is thus possible for example to replicate the situation that evidence of testing must be furnished within a predetermined time period. Furthermore, this is a way of counteracting misuse, since the proof-of-authority verifications do not have an unlimited lifetime.

According to a further embodiment, the proof-of-authority verification has at least a content-related validity. Content-related validity is understood as meaning that the proof-of-authority verifications only provide authorization that predetermined inputs can be made, such as for example confirmation that a test or inspection has been carried out. In other words, the proof-of-authority verifications are subject-specific. This is another way of counteracting misuse.

According to a further embodiment, the proof-of-authority verification has at least a user-related validity. User-related validity is understood as meaning that the proof-of-authority verifications only authorize a respective, predetermined entity to be able to make predetermined inputs, such as for example confirmation that a test or inspection has been carried out. In other words, the proof-of-authority verifications are individualized or user-related.

According to a further embodiment, one of the data blocks takes the form of a smart contract that responds to the presence of a predetermined condition by providing a proof-of-authority verification. Thus, for example, one of the data blocks may be formed to respond to the presence of a predetermined condition by providing a proof-of-authority verification. Consequently, it is not only the first entity that generates the proof-of-authority verifications, but instead the respective proof-of-authority verifications are only generated and provided when the predetermined conditions of a preceding step, such as for example evidence of interim tests or preliminary tests, have been demonstrated by entry in the blockchain. This dispenses with the need to generate proof-of-authority verifications at the beginning "in reserve" and archive them safe from unauthorized access, which increases security.

According to a further embodiment, a healing function is provided for altering and/or marking at least one data block. A smart contract that responds to explicit consent of all participants by naming or identifying errors or false data may be provided for this purpose. For example, in this way an interpretation of false contents can then be made possible. Furthermore, embodiments of the invention include such a system and a computer program product (non-transitory computer readable storage medium having instructions, which when executed by a processor, perform actions). A first computer program product may be provided for a first entity, while a second computer program product is provided for the further entities. The third computer program product may be a smart contract that responds to the presence of a predetermined case of error by providing an error handling measure and/or responds to the presence of a test trigger signal by triggering a functional test.

According to a further aspect, embodiments of the invention relate to a computer-implemented method for testing a technical system, in particular for conformity tracking, having the steps of:
  loading and/or performing a test control transaction, wherein
  in particular the test control transaction is loaded from a network application,
  the test control transaction comprises control commands and reference data;
  controlling a test module, wherein
  the control commands activate the test module in such a way that a test signal for a subsystem of the technical system is generated;
  acquiring measurement data for the subsystem as a reaction to the test signal, wherein
  the measurement data are acquired by the test module,
  in particular the measurement data are acquired by a sensor of the test module;
  calculating a test result on the basis of the measurement data and the reference data;
  controlling the technical system dependent on the test result and/or performing a control function dependent on the test result.

According to a further embodiment, a test trigger signal (37) calls for the loading and/or performing of the test control transaction.

According to a further embodiment, the activities of the system and/or of the test module are recorded and stored in a log file or a data record or in transactions.

According to a further embodiment, the test control transaction comprises a smart contract or is a smart contract.

According to a further embodiment, dependent on the test result, a reset signal (42) for the subsystem is provided or the control function provides a reset signal (42) for the subsystem dependent on the test result.

According to a further embodiment, dependent on the test result, a feedback signal (40) for the subsystem is provided or the control function provides a feedback signal (40) for the subsystem dependent on the test result.

According to a further embodiment, for example the test result is stored in a confirmation transaction. Alternatively or additionally, for example the measurement data are stored in a measurement data transaction. Alternatively or additionally, for example the test result is calculated on the basis of the measurement data of the measurement data transaction. Alternatively or additionally, for example the confirmation transaction and/or the measurement data transaction and/or test control transaction are/is secured by a respective proof-of-authority verification. For example, the confirmation transaction and/or the measurement data transaction is secured by a proof-of-authority verification of the technical system, of the subsystem or of the plant operator. For example, the test control transaction is secured by a proof-of-authority verification of an entity, a trustworthy entity (for example the TÜV) or a third party.

Alternatively or additionally, for example the confirmation transaction and/or the measurement data transaction and/or test control transaction are stored in a respective data block. Alternatively or additionally, for example additional/meta data for testing are stored in a confirmation transaction. Alternatively or additionally, for example the respective data block comprises the respective proof-of-authority verification of the corresponding transaction.

According to a further embodiment, the network application is performed in a peer-to-peer network (1) or is performed by the peer-to-peer network (1), wherein in particular the peer-to-peer network (1) is a private network.

According to a further embodiment, the proof-of-authority verification (10) has at least a time-limited validity period.

According to a further embodiment, the proof-of-authority verification (10) has at least a content-related validity.

According to a further embodiment, the proof-of-authority verification (10) has at least a user-related validity.

According to a further embodiment, a data block (4a, 4b, 4c) takes the form of a smart contract that responds to the presence of a predetermined condition by providing the proof-of-authority verification (10).

According to a further embodiment, a healing function is provided for altering and/or marking at least one of the data blocks (4a, 4b, 4c).

According to a further aspect, embodiments of the invention relate to a system for providing data comprising means for performing the steps of the method as claimed in one of claims 1 to 12.

According to a further aspect, embodiments of the invention relate to a device or a system for testing a/the technical system, in particular for conformity tracking, having:

for example a loading module, wherein
for example the loading module is designed for loading and/or performing a test control transaction,
for example the test control transaction is loaded from a network application,
for example the test control transaction comprises control commands and reference data;
for example a test module, wherein
for example the test module is designed to be controlled by the control commands,
for example the control commands activate the test module in such a way that a test signal for a subsystem of the technical system is generated;
for example an acquisition module, wherein
for example the acquisition module is designed for acquiring measurement data for the subsystem as a reaction to the test signal,
for example the measurement data are acquired by the test module,
for example the measurement data are acquired by a sensor of the test module;
for example the acquisition module is the sensor;
for example a calculation module, wherein for example the calculation module is designed for calculating a test result on the basis of the measurement data and the reference data;
for example a control module, wherein for example the control module is designed for controlling the technical system dependent on the test result and/or performing a control function dependent on the test result.

According to a further aspect, embodiments of the invention relate to a computer program product, comprising commands which, when the program is executed by a computer, cause it to perform at least one of the steps of claims 1 to 12, wherein the computer is assigned to the first entity (5a).

According to a further aspect, embodiments of the invention relate to a computer program product, comprising commands which, when the program is executed by a computer, cause it to perform at least one of the steps of claims 1 to 12, wherein the computer is assigned to one of the further entities (5b, 5c).

The technology of blockchains or "distributed ledgers" is currently a hotly discussed technology that can in particular be realized as a distributed database system or as a network application. Besides applications for local payment systems (for example Bitcoin), new application possibilities are being developed in the finance industry. In particular, transactions between firms can therefore be performed in a manner protected against manipulation without a mediator or clearing house. This allows new business models without a trusted mediator and reduces transaction costs, and new digital services can be provided flexibly without having to establish an infrastructure set up specifically for them and trust relationships. A transaction data record (or transaction, for short) protected by a blockchain comprises for example program code, which can also be referred to as a so-called "smart contract".

Unless indicated otherwise in the description below, the terms "carry out", "calculate", "computer-aided", "compute", "establish", "generate", "configure", "reconstruct" and the like preferably relate to actions and/or processes and/or processing steps that alter and/or produce data and/or that convert data into other data, wherein the data can in particular be presented or available as physical variables, for example as electrical impulses. In particular, the expression "computer" should be interpreted as broadly as possible in order to cover in particular all electronic devices having data processing properties. Computers can therefore be for example personal computers, servers, programmable logic controllers (PLCs), handheld computer systems, pocket PC devices, mobile radios and other communication devices that can process data in a computer-aided fashion, processors and other electronic devices for data processing.

Within the context of embodiments of the invention, "computer-aided" can be understood as meaning for example an implementation of the method in which in particular a processor performs at least one method step of the method.

Within the context of embodiments of the invention, a processor can be understood as meaning for example a machine or an electronic circuit. A processor can be in particular a central processing unit (CPU), a microprocessor or a microcontroller, for example an application-specific integrated circuit or a digital signal processor, possibly in combination with a memory unit for storing program commands, etc. A processor can also be for example an IC (integrated circuit), in particular an FPGA (field programmable gate array) or an ASIC (application-specific integrated circuit), or a DSP (digital signal processor) or a graphics processor GPU (graphics processing unit). A processor can also be understood as meaning a virtualized processor, a virtual machine or a soft CPU. It can also be for example a programmable processor that is equipped with configuration steps for performing the method according to embodiments of the invention or that is configured by configuration steps such that the programmable processor realizes the features according to embodiments of the invention for the method, the components, the modules or other aspects and/or subaspects of embodiments of the invention.

Within the context of embodiments of the invention, a "memory unit" or a "memory module" and the like can be understood as meaning for example a volatile memory in the form of a random access memory (RAM) or a permanent memory such as a hard disk or a data carrier.

Within the context of embodiments of the invention, a "module" can be understood as meaning for example a processor and/or a memory unit for storing program commands. For example, the processor is specifically designed to execute the program commands such that the processor performs functions to implement or realize the method according to embodiments of the invention or a step of the method according to embodiments of the invention. A module can also be for example a node of the distributed database system and/or of a network application that for example realizes the specific functions/features of a corresponding module. The respective modules can also be for example in the form of separate or standalone modules. To this end, the corresponding modules can for example comprise further elements. These elements are for example one or more interfaces (for example database interfaces, communication interfaces—for example network interface, WLAN interface) and/or an evaluation unit (for example a processor) and/or a memory unit. The interfaces can be used for example to interchange (for example receive, transmit, send or provide) data. The evaluation unit can be used for example to compare, check, process, assign or calculate data in computer-aided and/or automated fashion. The memory unit can be used for example to store, retrieve or provide data in a computer-aided and/or automated fashion.

Within the context of embodiments of the invention, "comprise", in particular with respect to data and/or information, can be understood as meaning for example (computer-aided) storage of corresponding information or of a corresponding datum in a data structure/data record (which for example is in turn stored in a memory unit).

Within the context of embodiments of the invention, "assign", in particular with respect to data and/or information, can be understood as meaning for example computer-aided assignment of data and/or information. For example, a second datum is assigned in this respect to a first datum by a memory address or a unique identifier (UID), for example by storing the first datum together with the memory address or the unique identifier of the second datum together in a data record.

Within the context of embodiments of the invention, "provide", in particular with respect to data and/or information, can be understood as meaning for example computer-aided provision. Provision takes place for example via an interface (for example a database interface, a network interface, an interface to a memory unit). This interface can be used for example to transmit and/or send and/or retrieve and/or receive corresponding data and/or information during the provision.

Within the context of embodiments of the invention, "provide" can also be understood as meaning for example loading or storing, for example of a transaction with corresponding data. This can take place for example on or by a memory module. "Provide" can also be understood as meaning for example transferring (or sending or transmitting) corresponding data from one node to another node of the blockchain or of the distributed database system (or the infrastructure thereof) or of the network application.

Within the context of embodiments of the invention, a "checksum", for example a data block checksum, a data checksum, a node checksum, a transaction checksum, a concatenation checksum or the like, can be understood as meaning for example a cryptographic checksum or cryptographic hash or hash value, which are formed or calculated, in particular by a cryptographic hash function, on the basis of a data record and/or data and/or one or more of the transactions and/or a subregion of a data block (for example the block header of a block of a blockchain or data block header of a data block of the distributed database system (or of the network application) or only some of the transactions of a data block). A checksum can be in particular a checksum/s or hash value/s of a hash tree (for example Merkle tree, Patricia tree). Furthermore, it can in particular also be understood as meaning a digital signature or a cryptographic message authentication code. The checksums can be used for example to provide cryptographic protection/protection against manipulation for the transactions and the data (records) stored therein on different levels of the database system. If for example a high level of security is called for, the checksums are for example produced and checked at transaction level. If a lower level of security is called for, the checksums are for example produced and checked at block level (for example on the basis of the entire data block or only on the basis of part of the data block and/or some of the transactions), for example.

Within the context of embodiments of the invention, a "data block checksum" can be understood as meaning a checksum that for example is calculated on the basis of some or all transactions of a data block. A node can then for example check/establish the integrity/authenticity of the corresponding part of a data block by the data block checksum. Additionally or alternatively, the data block checksum may in particular also have been formed on the basis of transactions of a preceding data block/predecessor data block of the data block. This data block checksum can in particular also be realized by a hash tree, for example a Merkle tree [1] or a Patricia tree, wherein the data block checksum is in particular the root checksum of the Merkle tree or of a Patricia tree or of a binary hash tree. In particular, transactions are safeguarded by further checksums from the Merkle tree or Patricia tree (for example by using the transaction checksums), wherein in particular the further checksums are leaves in the Merkle tree or Patricia tree. The data block checksum can thus for example safeguard the transactions by virtue of the root checksum being formed from the further checksums. The data block checksum can in particular be calculated for transactions of a specific data block of the data blocks. In particular, such a data block checksum can be adopted in a succeeding data block of the specific data block in order to concatenate this succeeding data block for example with its preceding data blocks, and in particular thus make an integrity of the distributed database system (or of the network application) checkable. This allows the data block checksum for example to undertake the function of the concatenation checksum or to be adopted in the concatenation checksum. The header of a data block (for example of a new data block or of the data block for which the data block checksum has been formed) can for example comprise the data block checksum.

Within the context of embodiments of the invention, a "transaction checksum" can be understood as meaning a checksum that is in particular formed on the basis of a transaction of a data block. Additionally, for example a calculation of a data block checksum for a corresponding data block can be expedited, since for this purpose for example already calculated transaction checksums can immediately be used as leaves for example of a Merkle tree.

In embodiments of the invention, for example, checksums (for example transaction checksums) are on the basis of pre-standardized or pre-specified functions directed at safety (for example for testing the subsystem or a function or safety function of the subsystem). Such functions directed at safety are for example the same throughout the plants (for example the technical system) and are plant-specifically adapted. With a plant-specific adaptation, a new checksum of the function is obtained for example for a corresponding adapted function directed at safety. The adapted function directed at safety and/or the associated checksum is for example used throughout the lifetime of the plant and/or is used as a reference for changes. For example, the structure of the plant and/or of functions directed at safety are replicated by the Merkle tree and its structure.

Within the context of embodiments of the invention, a "concatenation checksum" can be understood as meaning a checksum that in particular indicates or references the preceding data block of the distributed database system (or of the network application) for a respective data block of the distributed database system (or of the network application) (frequently referred to in specialist literature in particular as "previous block hash") [1]. This in particular involves an applicable concatenation checksum being formed for the corresponding preceding data block. A transaction checksum or the data block checksum of a data block (that is to say an existing data block of the distributed database system or of the network application) can be used for example as the concatenation checksum, in order to concatenate a new data block with an (existing) data block of the distributed database system (or of the network application). It is however also possible for example for a checksum to be formed on the basis of a header of the preceding data block or on the basis of all of the preceding data block and used as concatenation checksum. This can for example also be calculated for multiple or all preceding data blocks. It is for example also feasible for the concatenation checksum to be formed on the basis of the header of a data block and the data block checksum. However, a respective data block of the distributed database system (or of the network application) advantageously comprises a respective concatenation checksum that was calculated for or relates to a preceding data block, in particular even more advantageously the directly preceding data block, of the respective data block. It is for example also possible for a corresponding concatenation checksum to be also formed only on the basis of a part of the corresponding data block (for example preceding data block). This allows for example a data block that comprises an integrity-protected part and an unprotected part to be realized. This would allow for example a data block whose integrity-protected part is invariable and whose unprotected part can also still be altered later to be realized. Integrity-protected is intended to be understood here as meaning in particular that an alteration of integrity-protected data can be established by a checksum.

The data stored for example in a transaction of a data block can in particular be provided in different ways. Instead of the data, for example user data such as measurement data or data/ownership relationships pertaining to assets, a transaction of a data block can for example comprise only the checksum for these data. The corresponding checksum can be realized in various ways. This can be for example a corresponding data block checksum of a data block (with the corresponding data) of another database or of the distributed database system (or of the network application), a transaction checksum of a data block with the corresponding data (of the distributed database system/the network application or of another database) or a data checksum that was formed on the basis of the data.

Additionally, the corresponding transaction can also comprise a reference to or an indication of a memory location (for example an address of a file server and details as to where the corresponding data can be found on the file server; or an address of another distributed database/network application that comprises the data). The corresponding data could then for example also be provided in a further transaction of a further data block of the distributed database system/the network application (for example if the corresponding data and the associated checksums are contained in different data blocks). It is for example also conceivable however for these data to be provided via another communication channel (for example via another database and/or a cryptographically secured communication channel).

It is also possible for example for an additional data record in addition to the checksum (for example a reference to or an indication of a memory location) to be registered in the corresponding transactions, in particular indicating a memory location from which the data can be retrieved. This is advantageous in particular for keeping a data size of the blockchain or of the distributed database system/network application as small as possible.

Within the context of embodiments of the invention, "security-protected" can be understood as meaning for example protection realized in particular by a cryptographic method. For example, this can be realized by using the distributed database system (or the network application) to provide or transfer or send corresponding data/transactions. This is achieved by combining the various (cryptographic) checksums, in that they interact in particular in a synergistic fashion in order for example to improve the security or cryptographic security for the data of the transactions. In other words, within the context of embodiments of the invention, "security-protected" can in particular also be understood as meaning "cryptographically protected" and/or "protected against manipulation", wherein "protected against manipulation" can also be referred to as "integrity-protected".

Within the context of embodiments of the invention, "concatenation of (the) data blocks of a distributed database system/a network application" can be understood as meaning for example that data blocks each comprise information (for example a concatenation checksum) referring to or referencing another data block or multiple other data blocks of the distributed database system (or of the network application) [1][4][5].

Within the context of embodiments of the invention, "insertion into the distributed database system/the network application" and the like can be understood as meaning for example that in particular a transaction or the transactions or a data block with its transactions is transmitted to one or more nodes of a distributed database system/a network application. If these transactions are for example validated successfully (for example by the node/s), these transactions are in particular concatenated as a new data block with at least one existing data block of the distributed database system/the network application [1][4][5]. For this purpose, the corresponding transactions are stored for example in a new data block. In particular, this validation and/or concatenation can be performed by a trusted node (for example a mining node, a blockchain oracle or a blockchain platform). In particular, a blockchain platform can be understood as meaning a blockchain as a service, as proposed in particular by Microsoft or IBM. In particular, a trusted node and/or a node can each store a node checksum (for example a digital signature) in a data block (for example in the data block validated and generated thereby, which is then concatenated), in order in particular to make it possible to identify the originator of the data block and/or to make it possible to identify the node. In this case, this node checksum indicates which node has for example concatenated the corresponding data block with at least one other data block of the distributed database system.

Within the context of embodiments of the invention, "transaction" or "transactions" can be understood as meaning for example a smart contract [4][5], a data structure or a transaction data record that in each case comprises in particular one of the transactions or multiple transactions. Within the context of embodiments of the invention, "transaction" or "transactions" can also be understood as meaning for example the data of a transaction of a data block of a blockchain. A transaction can in particular comprise a program code that provides for example a smart contract. For example, within the context of embodiments of the invention, a transaction can also be understood as meaning a control transaction and/or confirmation transaction. Alternatively, a transaction can be for example a data structure that stores data (for example the control commands and/or contractual data and/or other data such as video data, user data, measurement data, etc.).

In particular, "storage of transactions in data blocks", "storage of transactions" and the like is intended to be understood as meaning direct storage or indirect storage. Direct storage can be understood as meaning for example that the corresponding data block (of the distributed database system/the network application) or the corresponding transaction (of the distributed database system/the network application) comprises the respective data. Indirect storage can be understood as meaning for example that the corresponding data block or the corresponding transaction comprises a checksum and optionally an additional data record (for example a reference to or an indication of a memory location) for corresponding data, and the corresponding data are therefore not stored in the data block (or the transaction) directly (that is to say instead only a checksum for these data). In particular, the storage of transactions in data blocks can for example result in these checksums being validated, as explained under "insertion into the distributed database system/the network application".

Within the context of embodiments of the invention, a "program code" (for example a smart contract or chain code) can be understood as meaning for example a program command/or multiple program commands, in particular stored in one or more transactions. The program code is in particular executable and is for example executed by the distributed database system/the network application. This can be realized by an execution environment (for example a virtual machine), wherein the execution environment and the program code are Turing complete. The program code is executed by the infrastructure of the distributed database system/the network application [4] [5]. This involves for example a virtual machine being realized by the infrastructure of the distributed database system (or of the network application).

Within the context of embodiments of the invention, a "smart contract" can be understood as meaning for example an executable program code [4] [5] (see in particular the "program code" definition). The smart contract is stored in a transaction of a distributed database system/the network application (for example a blockchain), for example in a data block of the distributed database system (or of the network application). For example, the smart contract can be executed in the same way as explained in the definition of "program code", in particular within the context of embodiments of the invention.

Within the context of embodiments of the invention, "smart contract process" can be understood as meaning in particular an execution of a program code (for example of the control commands) in a process by the distributed database system/the network application, wherein for example the corresponding infrastructure of the distributed database system/network application executes the program code.

Within the context of embodiments of the invention, "proof-of-work verification" can be understood as meaning for example solving a computationally intensive problem that in particular needs to be solved dependent on the data block content/content of a specific transaction [1] [4] [5]. Such a computationally intensive problem is for example also referred to as a cryptographic puzzle.

Within the context of embodiments of the invention, a "network application", can be understood as meaning for example a locally distributed database, a distributed database system, a distributed database, a peer-2-peer application, a distributed storage management system, a blockchain, a distributed ledger, a distributed memory system, a distributed ledger technology (DLT) based system (DLTS), a revision-proof database system, a cloud, a cloud service, a blockchain in a cloud or a peer-to-peer database. It is also possible for example for different implementations of a blockchain or DLTS to be used, such as for example a blockchain or DLTS that is implemented by a directed acyclic graph (DAG), a cryptographic puzzle, a hash graph or a combination of the implementation variants [6][7]. It is also possible for example for different consensus methods (consensus algorithms) to be implemented. These can be for example a consensus method by a cryptographic puzzle, gossip about gossip, virtual voting or a combination of the methods (for example gossip about gossip in combination with virtual voting) [6] [7]. If for example a blockchain is used, then it can be implemented in particular by a Bitcoin-based realization or an Ethereum-based realization [1] [4] [5]. A "distributed database system" or a "network application" can also be understood as meaning for example a distributed database system or a network application that has at least some of its nodes and/or devices and/or infrastructure realized by a cloud. For example, the corresponding components are realized as nodes/devices in the cloud (for example as virtual nodes in a virtual machine). This can take place for example by VM-ware, Amazon Web Services or Microsoft Azure. On account of the high flexibility of the implementation variants explained, it is in particular also possible for subaspects of the implementation variants to be combined with one another, for example by using a hash graph as a blockchain, wherein the blockchain itself can for example also be blockless.

If for example a directed acyclic graph (DAG) is used (for example IOTA or Tangle), then in particular transactions or blocks or nodes of the graph are connected to one another via directed edges. This means in particular that (all) edges (always) have the same direction, similarly to in the case of for example time. In other words, it is in particular not possible to run or jump backwards (that is to say counter to the same common direction) through the transactions or the blocks or the nodes of the graph. Acyclic in this instance means in particular that there are no loops when running through the graph.

The distributed database system/the network application can be for example a public distributed database system/a public network application (for example a public blockchain) or a closed (or private) distributed database system/a closed network application (for example a private blockchain).

If it is for example a public distributed database system/a public network application, this means that new nodes and/or devices are able to join or be accepted by the distributed database system/the network application without proof of authorization or without authentication or without registration information or without credentials. In particular, the operators of the nodes and/or devices can remain anonymous in such a case.

If the distributed database system/the network application is for example a closed distributed database system, then new nodes and/or devices require for example valid proof of authorization and/or valid authentication information and/or valid credentials and/or valid registration information, in order to be able to join or be accepted by the distributed database system.

A distributed database system/the network application can also be for example a distributed communication system for data interchange. This can be for example a network or a peer-2-peer network.

A/the distributed database system can also be for example a local distributed database system and/or a local distributed communication system.

A "network application" can also be for example a network application infrastructure or the network application comprises a corresponding network application infrastructure. This infrastructure can for example comprise nodes and/or communication networks and/or a data interface and/or further components in order to realize or perform the network application. The network application can be for example a distributed network application (for example a distributed peer-2-peer application or a distributed database system), which is for example implemented on multiple nodes of the network application infrastructure.

Within the context of embodiments of the invention, "data block", which, in particular depending on context and realization, can also be referred to as "link" or "block", can be understood as meaning for example a data block of a distributed database system/a network application (for example a blockchain or a peer-to-peer database) that is in particular realized as a data structure and comprises in each case one of the transactions or a number of the transactions. In one implementation, the database (or the database system) can be for example a DLT based system (DLTS) or a blockchain and a data block can be a block of the blockchain or of the DLTS. A data block can for example comprise details pertaining to the size (data size in bytes) of the data block, a data block header (block header), a transaction counter and one or more transactions [1]. The data block header can for example comprise a version, a concatenation checksum, a data block checksum, a timestamp, proof-of-work verification and a nonce (one-time value, random value or counter used for the proof-of-work verification) [1] [4] [5]. A data block can for example also be just a specific memory area or address area for the total data stored in the distributed database system/the network application. It is thus possible for example for blockless distributed database systems, such as for example the IoT chain (ITC), IOTA and Byteball, to be realized. These involve in particular the functionalities of the blocks of a blockchain and of the transactions being combined with one another such that for example the transactions themselves protect the sequence or chain of transactions (of the distributed database system/the network application) (that is to say store them in a security-protected fashion, in particular). To this end, for example a concatenation checksum can be used to concatenate the transactions themselves with one another in that a separate checksum or the transaction checksum of one or more transactions is used as the concatenation checksum, which is stored in the corresponding new transaction as well when a new transaction is stored in the distributed database system/the network application. In such an embodiment, a data block can for example also comprise one or more transactions, wherein, in the simplest case, for example one data block corresponds to one transaction.

Within the context of embodiments of the invention, "nonce" can be understood as meaning for example a cryptographic nonce (abbreviation for "used only once" [2] or "number used once" [3]). In particular, a nonce denotes individual combinations of numbers or a combination of letters that are used just once in the respective context (for example transaction, data transfer).

Within the context of embodiments of the invention, "preceding data blocks of a (specific) data block of the distributed database system/the network application" can be understood as meaning for example the data block of the distributed database system/the network application that in particular directly precedes a (specific) data block. Alternatively, "preceding data blocks of a (specific) data block of the distributed database system/the network application" can in particular also be understood as meaning all data blocks of the distributed database system/the network application that precede the specific data block. As a result, the concatenation checksum or the transaction checksum can for example be formed in particular only on the basis of the data block (or the transactions thereof) directly preceding the specific data block or on the basis of all data blocks (or the transactions thereof) preceding the first data block.

Within the context of embodiments of the invention, a "blockchain node", "node", "node of a distributed database system/the network application" and the like can be understood as meaning for example devices (for example field devices, cell phones), computers, smartphones, clients or subscribers that perform operations for (with) the distributed database system/the network application (for example a blockchain) [1] [4] [5]. Such nodes can for example perform transactions of a distributed database system/a network application or the data blocks thereof or insert or concatenate new data blocks with new transactions into the distributed database system/the network application by new data blocks. In particular, this validation and/or concatenation can be performed by a trusted node (for example a mining node) or solely by trusted nodes. A trusted node is for example a node that has additional security measures (for example firewalls, access restrictions to the node or the like) in order to prevent manipulation of the node. Alternatively or additionally, a trusted node can for example store a node checksum (for example a digital signature or a certificate) in a new data block when the new data block is concatenated with the distributed database system/the network application. It is thus possible in particular to provide evidence indicating that the corresponding data block was inserted by a specific node or indicating its origin. The devices (for example the corresponding device) are for example devices of a technical system and/or industrial plant and/or of an automation network and/or of a production installation that are in particular also a node of the distributed database system/the network application. The devices in this instance can be for example field devices or devices in the Internet of Things that are in particular also a node of the distributed database system/the network application. Nodes can for example also comprise at least one processor, for example in order to perform their computer-implemented functionality.

Within the context of embodiments of the invention, a "blockchain oracle" and the like can be understood as meaning for example nodes, devices or computers that have for example a security module that comprises for example software protection mechanisms (for example cryptographic methods), mechanical protection devices (for example a lockable housing) or electrical protection devices (for example tamperproofing or a protection system that erases the data of the security module in the event of inadmissible use/handling of the blockchain oracle). The security module can for example comprise cryptographic keys which are necessary for calculating the checksums (for example transaction checksums or node checksums).

Within the context of embodiments of the invention, a "computer" or a "device" can be understood as meaning for example a computer (system), a client, a smartphone, a device or a server that are in each case arranged outside the blockchain or are not subscribers to the distributed database system/the network application (for example the blockchain) (that is to say do not carry out operations with the distributed database system/the network application, or only query it, without however carrying out transactions, inserting data blocks or calculating proof-of-work verification). Alternatively, a computer can in particular also be understood as meaning a node of the distributed database system/the network application. In other words, a device can in particular also be understood as meaning a node of the distributed database system/the network application or else a device outside the blockchain or the distributed database system/the network application. A device outside the distributed database system/the network application can for example access the data (for example transactions or control transactions) of the distributed database system/the network application and/or be activated by nodes (for example by smart contracts and/or blockchain oracles). If for example activation or control of a device (for example a device in the form of a node or a device outside the distributed database system/the network application) is realized by a node, this can take place for example by a smart contract that is in particular stored in a transaction of the distributed database system/the network application. The computer or device can for example also be part of the infrastructure that for example performs, realizes or comprises the network application or the distributed database system.

Furthermore, within the context of embodiments of the invention, the following can be understood for example by the terms given below.

A "failsafe control" (which for example can also be referred to as a safety-related system) can be understood as meaning for example a system (for example in accordance with DIN EN 61508-4:2002-11) that both performs the required safety functions necessary to achieve or maintain a safe state for the EUC and is intended itself or with other safety-related systems and other risk-reducing measures to achieve the necessary safety integrity for the required safety functions.

A failsafe control can for example be a programmable electronic system for protection or monitoring. Such a control can for example comprise one or more programmable electronic devices, for example including one or more or all of the elements of the system, such as for example supplying energy, sensors and other input devices, data connections and other communication paths and also actuators and other input devices.

Within the context of embodiments of the invention, "EUC" (equipment under control) can be understood as meaning for example a device, machine, apparatus or installation that is used for example for production, material processing, transport, medical or other activities.

Within the context of embodiments of the invention, a "safety function" or "protective circuit" can be understood as meaning for example a function that is performed for example by a safety-related system or other risk-reducing measures and is intended to achieve or maintain a safe state for the EUC in consideration of a dangerous incident that has been discovered.

Within the context of embodiments of the invention, a "protective logic" (which can be referred to for example as safety-related software) can be understood as meaning for example software and/or a program code and/or an application that is used for carrying out safety functions and/or additionally for carrying out testing functions in a safety-related system and/or in a failsafe control.

Within the context of embodiments of the invention, a "safe state" can be understood as meaning for example the state of the EUC in which safety (for example a specified operational safety of the technical system) is achieved.

Within the context of embodiments of the invention, a "test module" can be understood as meaning for example a test device or a test harness or a device that is for example capable (to a reasonable degree) of simulating the operating environment of the software or hardware during development by application of test cases to the software and recording the response. The test module can for example also include test case generators and devices to verify the test results (either automatically against values assumed to be correct or by manual analysis).

Within the context of embodiments of the invention, a "control signal" can be understood as meaning for example a signal that is transferred between the software and/or hardware components involved for carrying out tests.

Within the context of embodiments of the invention, a "trigger" can be understood as meaning for example a trigger that excites and/or activates the safety-related function and/or the test harness, for example according to specifications and reference data. A trigger can be for example a person who triggers the safety-related function or software that brings it about, for example by simulation in the sensor (for example the so-called HART function of intelligent field devices).

Within the context of embodiments of the invention, "reference data" can be understood as meaning specifications and/or requirements that are specified for example by an entity (for example the notified body) for a protective circuit, such as for example the duration between triggering and achieving the safe state.

BRIEF DESCRIPTION

Some of the embodiments will be described in detail, with reference to the following figures, wherein like designations denote like members, wherein:

FIG. 10 shows a further exemplary embodiment of the invention.

DETAILED DESCRIPTION

Figure 1:
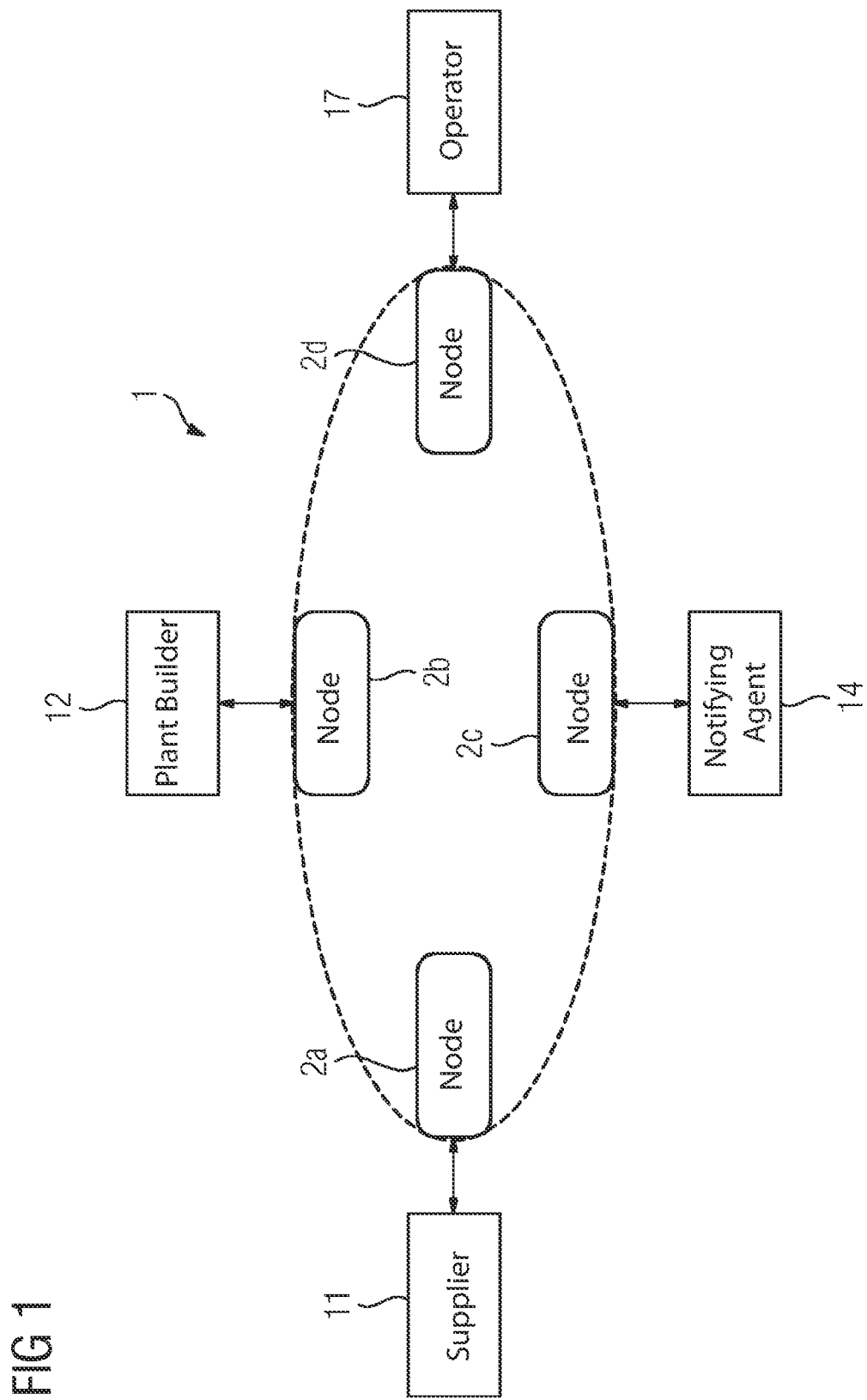
FIG. 1 shows a schematic representation of a peer-to-peer network.

Reference is first made to FIG. 1.

A distributed peer-to-peer network 1 is represented, formed for implementing a computer-implemented method for providing data, in the present exemplary embodiment for conformity tracking of a system or a plant.

In the present exemplary embodiment, the peer-to-peer network 1 comprises four nodes 2a, 2b, 2c, 2d.

A peer-to-peer network 1 is understood here as meaning a computer network in which all of the nodes 2a, 2b, 2c, 2d are of equal status, by contrast with a computer network with a client/server architecture.

At each of the nodes 2a, 2b, 2c, 2d there can be connected a computer or a cloud computer. The resultant computing power of the overall system forms the hardware basis.

For conformity tracking of a system or a plant, only a limited and specifically authorized group of users requires access to the data. Therefore, in the present exemplary embodiment—as explained in detail later—a private blockchain is formed.

In the scenario represented in FIG. 1, the first node 2a is assigned to a supplier, the second node 2b is assigned to a factory or plant builder, the third node 2c is assigned to an inspector or notifying agent and the fourth node 2d is assigned to an operator.

Apart from hardware components, each node 2a, 2b, 2c, 2d also contains software components in the form of computer program products, which are blockchain software (a stack), the tasks and functions of which are explained in detail later.

Furthermore, for conformity tracking, for example a user interface can also be provided or existing planning, engineering or executing software incorporated. In the latter case, the user interface of existing software (for example COMOS—a standard database platform for plant builders) is adapted such that the required information relating to conformity can be published with corresponding meta data in a distributed ledger or can be read back as and when required in order to make further working steps possible.

A distributed ledger is understood as meaning a special form of electronic data processing and storage. A local database that allows subscribers of the network to have common writing and reading authorization is referred to as "distributed ledger". By contrast with a centrally managed database, there is no need in this network for a central entity that performs new entries in the database. New data records can be added at any time by the subscribers themselves. A subsequent updating process ensures that the latest state of the database is always available to all of the subscribers. A particular configuration of the distributed ledger is a blockchain 3.

Figure 2:
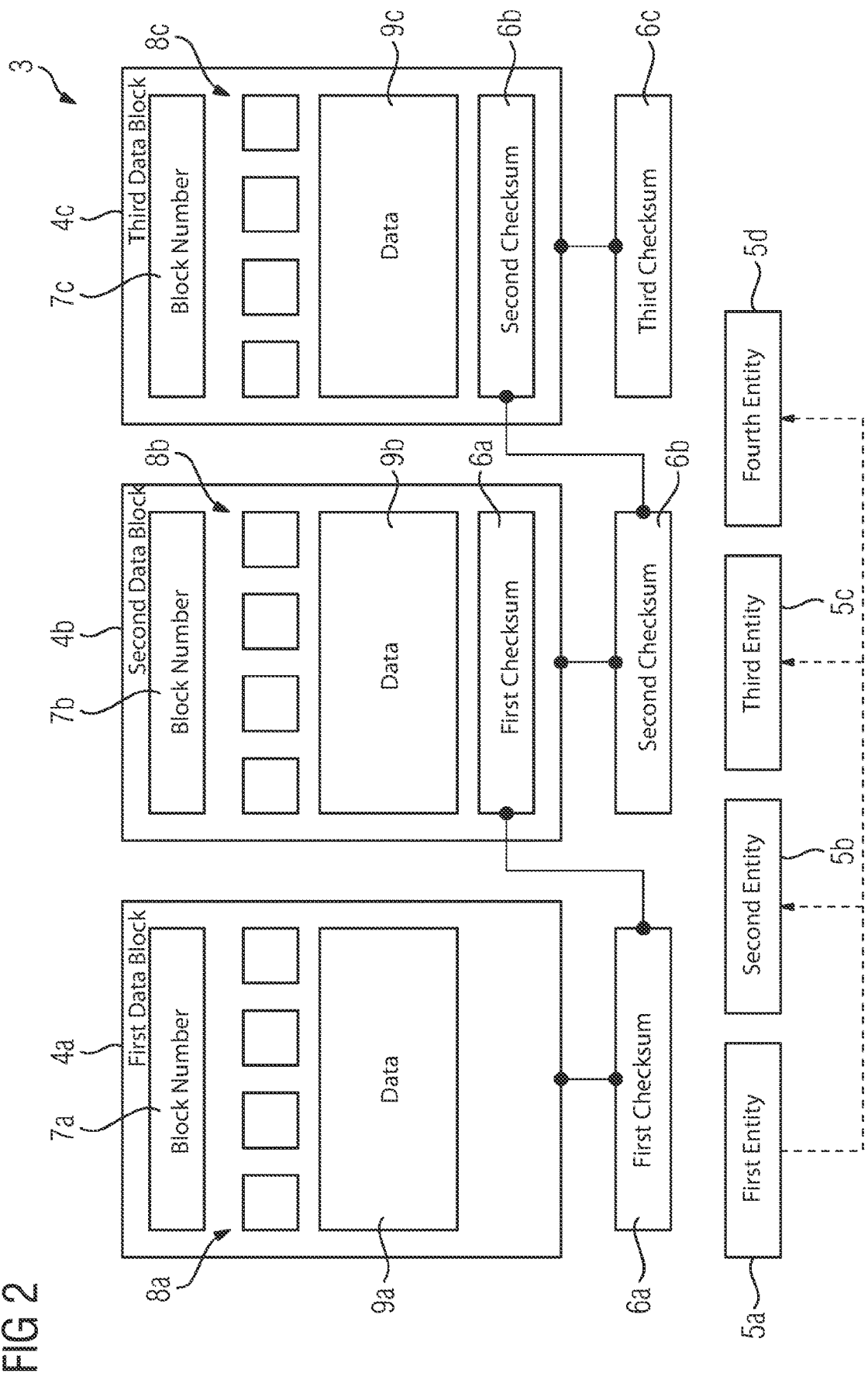
FIG. 2 shows a schematic representation of a blockchain used in the peer-to-peer network shown in FIG. 1.

Reference is now additionally made to FIG. 2.

The blockchain 3 is represented. A blockchain 3 is understood as meaning a continuously extendable list of data records that are concatenated to one another by cryptographic methods. Each block typically contains a cryptographically secure checksum of the preceding block, and also possibly a timestamp and further transaction data.

In the present exemplary embodiment, the blockchain 3 has a first data block 4a with a first data record and a second data block 4b with a second data record and also a third data block 4c with a third data record. In the course of conformity tracking, a first step comprises first producing the first data block 4a, with which the blockchain 3 is begun. Further steps comprise adding the second data block 4b with the second data record and also the third data block 4c with the third data record, and thus extending the blockchain 3.

Each of the data blocks 4a, 4b, 4c is assigned a respective checksum 6a, 6b, 6c, such as for example a hash value. For determining the checksum 6a, 6b, 6c, for example a hash function can be used, such as the SHA-256 algorithm (secure hash algorithm).

The data records of the respective data blocks 4a, 4b, 4c have in each case a block number 7a, 7b, 7c representative of the respective position in the blockchain 3, one or more digital signatures 8a, 8b, 8c representative of the respective user, data 9a, 9b, 9c concerning the conformity tracking, such as for example test certificates etc., and the respective checksum 6a, 6b, 6c of the preceding data block 4a, 4b.

Thus, the first data block 4a, since it is the first data block 4a, does not have a checksum of a preceding block, while the second data block 4b has the first checksum 6a of the first data block 4a and the third data block 4b has the second checksum 6b of the second data block 4b.

The first data block 4a is assigned to a first entity 5a, in the present exemplary embodiment the supplier 11, while the second data block 4b is assigned to a second entity 5b, for example the factory/plant builder 12, and the third data block 4c is assigned to a third entity 5c, for example the notifying agent 14. As a departure from this, other assignments are also possible.

The first entity 5a, that is to say the entity that starts the blockchain 3 with the first data block 4a, is intended in the present exemplary embodiment to emit proof-of-authority verifications 10. In other words, the first entity 5a can be regarded as an origin or base entity.

The proof-of-authority verifications 10 are transmitted to the other entities 5b, 5c. The proof-of-authority verifications 10 enable the other entities 5b, 5c to add further data blocks 4b, 4c to the blockchain 3.

The proof-of-authority verifications 10 can have a time-limited validity and/or a content-related validity and/or a user-related validity.

A time-limited validity is understood here as meaning that the proof-of-authority verifications 10 have an expiry date and, after the expiry date has passed, can no longer enable one of the further entities 5b, 5c to add further data blocks 4b, 4c to the blockchain 3. It is thus possible for example to replicate the situation that evidence of testing must be furnished within a predetermined time period. Furthermore, this is a way of counteracting misuse, since a proof-of-authority verification 10 does not have an unlimited lifetime.

Content-related validity is understood as meaning that the proof-of-authority verifications 10 only provide authorization that predetermined inputs can be made, such as for example confirmation that a test or inspection has been carried out. In other words, the proof-of-authority verifications 10 are subject-specific. This is another way of counteracting misuse.

User-related validity is understood as meaning that the proof-of-authority verifications 10 only authorize a respective, predetermined entity 5a, 5b, 5c to be able to make predetermined inputs, such as for example confirmation that a test or inspection has been carried out. In other words, the proof-of-authority verifications 10 are individualized or user-related.

It can also be provided that one of the data blocks 4a, 4b, 4c is in the form of a smart contract. Smart contracts are understood here as meaning contracts on a software basis in which a wide variety of contract terms and conditions can be stored. During the course of the contract, certain linked actions (for example payments) can be performed independently when there is a corresponding trigger (for example fulfillment of contract terms and conditions).

Thus, one of the data blocks 4a, 4b, 4c may be formed to respond to the presence of a predetermined condition by providing a proof-of-authority verification 10. Consequently, it is not only the first entity 5a that generates the proof-of-authority verifications 10, but instead the respective proof-of-authority verifications 10 are only generated and provided when the predetermined conditions of a preceding step, such as for example evidence of interim tests or preliminary tests, have been demonstrated. This dispenses with the need to generate proof-of-authority verifications 10 at the beginning "in reserve" and archive them safe from unauthorized access, which increases security.

Furthermore, one of the data blocks 4a, 4b, 4c may be formed to respond to the presence of a predetermined case of error by providing an error handling measure. Thus, for example, the blockchain 3 may be used for providing error handling measures. If an error occurs in the case of a component of a plant, such as for example a field device, the corresponding error signal triggers the data block 4a, 4b, 4c formed as a smart contract, so that then a corresponding measure for error handling, such as deactivation of the defective field device and notification of exchange, is implemented.

Also, a healing function is provided for altering one or more of the data blocks 4a, 4b, 4c.

Since a limited group of known participants act, an own smart contract with a healing function that responds to explicit consent of all participants by naming or identifying errors or false data may be realized for "healing" errors in the implementation of the technology. This can advantageously be used in a first phase of the implementation. For the case of data reduction or technically caused migration, the transfer of the data retention into a newly initiated blockchain 3 may be provided.

Figure 3:
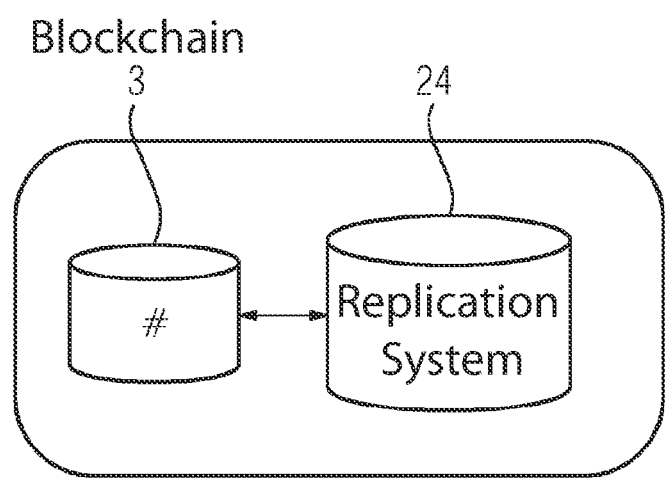
FIG. 3 shows a schematic representation of a memory expansion for increasing performance.

Reference is now additionally made to FIG. 3.

Mass data processing for increasing performance is represented. For this purpose, a replication system 24, such as for example IPFS, may be used, wherein a pointer referring to corresponding memory areas of the replication system 24 is archived in an encrypted form in the blockchain 3.

This can be regarded as an operating system or a distributed and highly available execution environment.

Figure 4:
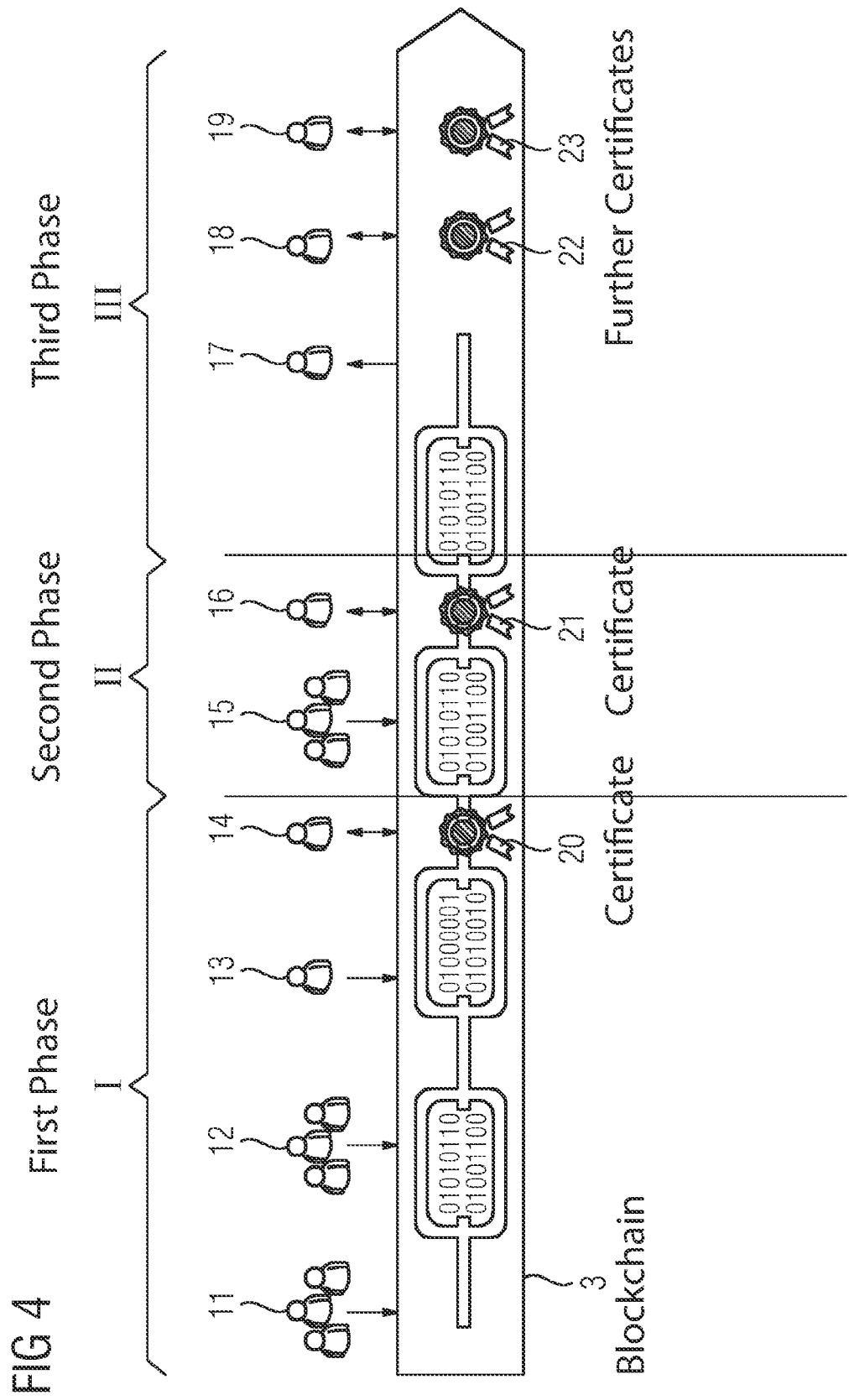
FIG. 4 shows a schematic representation of a method sequence.

An exemplary embodiment of a method sequence is now explained with additional reference to FIG. 4.

The method sequence is divided into three phases, a first phase I of compliant design and planning, a second phase II of compliant construction, and a third phase III of compliant operation, maintenance and care.

In the first phase I, in the present exemplary embodiment the supplier 11, the plant builder 12, a quality manager 13 and the notifying agent 14 are involved.

In the second phase II, in the present exemplary embodiment a plant builder—assembly 15 and a further notifying agent 16 are involved.

In the third phase III, in the present exemplary embodiment the operator 17, a further notifying agent 18 and a supervisory authority 19 are involved.

Once a distributed peer-to-peer network 1 has been set up, in the first phase I in the present exemplary embodiment the supplier 11 as the first entity 5a creates for example the first data block 4a for the blockchain 3 with a first checksum 6a. Furthermore, the supplier 11 as the first entity 4a creates the proof-of-authority verifications 10.

As a departure from the present exemplary embodiment, the blockchain may also be initiated by the operator 17 or by the supervisory authority 19, such as for example the TÜV, for the operator 17, since the operator 17 must be the first in terms of time to ensure conformity for the plant. Therefore, at the beginning the operator 17, then the supervisory authority 19, such as the TÜV or other authorities, then the plant builder 12, then its suppliers 11 and then various further participants are to be authorized to feed data into the blockchain 3. The operator 17 or the supervisory authority 19 can administer who is authorized when to publish and/or to read data. The sequence of data provision depends on the respective official regulations, the necessary technical systems and many other plant-specific constraints.

In a further step, the plant builder 12 as the second entity 5b generates for example the further data block 4b with a further checksum 6b, and in a further step the quality manager 13 generates the further data block 4c with a further checksum 6c.

The checksum 6a, 6b of the preceding data block 6a, 6b is inserted into the respective following data blocks. Therefore, the checksum 6a of the first data block 4a is inserted into the further data block 4b and the further checksum 6b is inserted into the further data block 4c.

The further data blocks 4b, 4c are only added to the blockchain 3 once the plant builder 12 as the second instance 5b and the quality manager 13 have been authorized with a respective proof-of-authority 10.

After that, the blockchain 3 is available to all of the stated participants, and furthermore copies of the blockchain 3 are distributed among all of the nodes 2a, 2b, 2c, 2d.

In a further step, after checking the documentation archived in the blockchain 3, the notifying agent 14 creates a certificate 20 and adds it for example as a document, such as for example as a pdf document, to the blockchain 3, once it has been authorized with a respective proof-of-authority 10. Consequently, the certificate 20 is then also available to all of the stated participants for inspection. Furthermore, copies of the blockchain 3 are distributed among all of the nodes 2a, 2b, 2c, 2d.

In the second phase II, the group of participants is increased in size, to be precise by the plant builder—assembly 15 and the further notifying agent 16, which are provided for this purpose with respective proof-of-authority verifications 10.

The plant builder—assembly 15 generates a further data block with a further checksum and adds it to the blockchain 3, once it has been authorized with its respective proof-of-authority verification 10. Following that, the notified body 16, after checking the documentation archived in the blockchain 3, adds a certificate 21 to the blockchain 3, once the notified body 16 has been authorized with its proof-of-authority verification 10. Alternatively, instead of the notified body, this may for example also be carried out by the plant builder.

In the third phase II, the group of participants is increased in size still further, to be precise by the operator 17, the further notifying agent 18 and the supervisory authority 19, which are provided for this purpose with respective proof-of-authority verifications 10.

Possibly, the operator 17 generates a further data block (not represented), for example for documentation of the properly performed maintenance and testing.

Following that, the further notifying agent 18 and the supervisory authority 19, after respectively checking the documentation archived in the blockchain 3, add further certificates 22, 23 to the blockchain 3, once they have been authorized with their proof-of-authority verifications 10.

Consequently, the blockchain 3 represents a virtually unfalsifiable distributed, since replicated and consequently highly available data retention and execution environment, in which conformity tracking can thus take place automatically.

Figure 5:
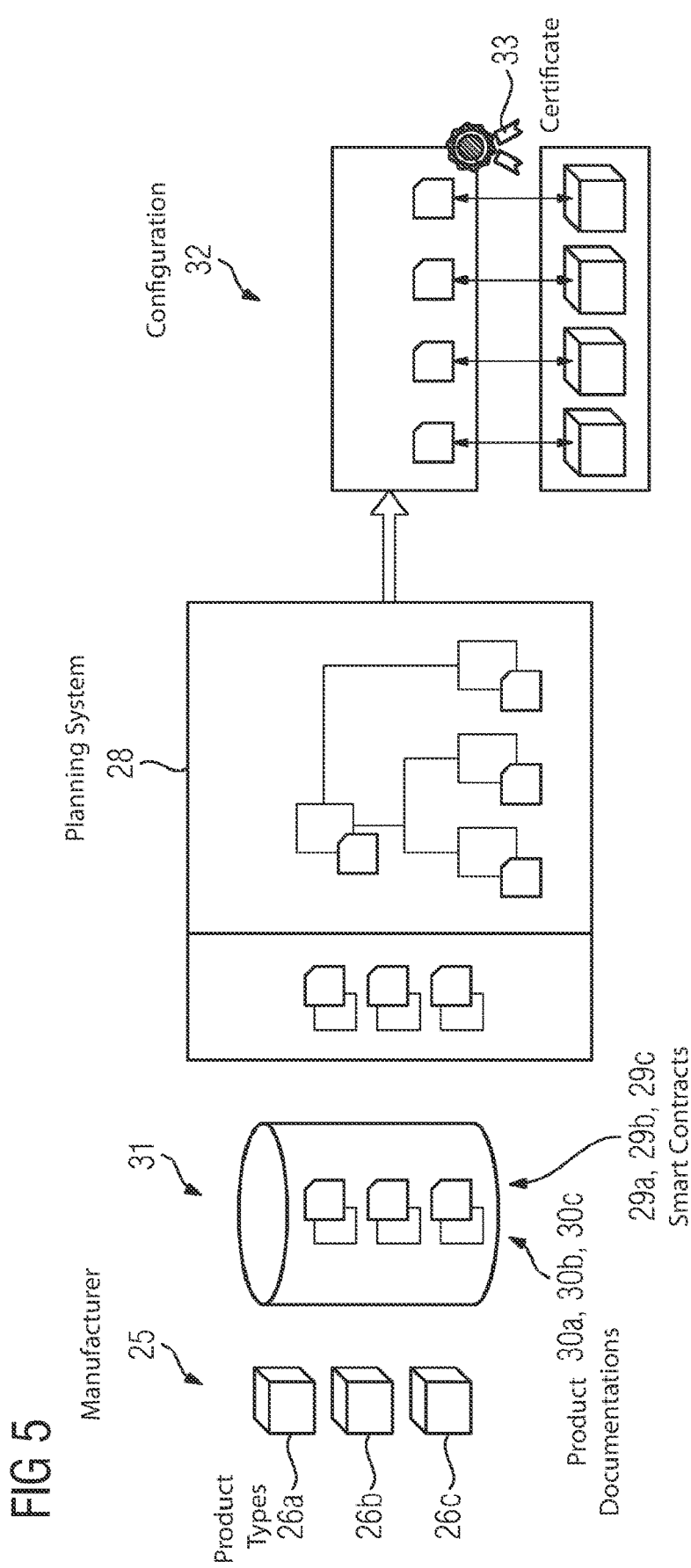
FIG. 5 shows a schematic representation of a further method sequence concerning an application in the case of systems in process or production plants in the course of the planning of the plant.

Reference is now additionally made to FIG. 5, in order to explain a further exemplary embodiment concerning an application in the case of systems in process or production plants in the course of planning the plant.

In the case of process plants, the blockchain 3 and the data that can be stored by it are part of the process plant, comparable to the traditional test documentation to be kept with the plant. The blockchain 3 is for example maintained by the responsible owner or operator 17, or cared for further than in the function as the then first entity 5a. In other words, participants can change their roles, i.e. the role or function of the first instance 5a passes from the suppliers 11 to the operator 17.

For this, the operator 17 instigates the creation or care of the blockchain 3 and administers the required smart contracts 29a, 29b, 29c. Required participants, example the plant builder 12, its suppliers 11, the notified body 14, the supervisory authority 19 etc. are authorized to contribute information in accordance with their role. Authentication is provided by the blockchain 3 and may possibly also be extended, for example by 2-factor authentication or common multi-party keys.

The selection and enactment of the necessary/desired smart contracts 29a, 29b, 29c can be initiated and controlled by the party responsible, for example the operator 17. It may possibly enlist the help of a competent partner, such as for example the notified body 14, which validates and approves these smart contracts.

At the beginning of the process, for example the operator 17 and a planner, such as for example the plant builder 12, specify relevant requirements for the blockchain 3 of the factory/plant, for example jointly with the supervisory authority 19 and the notifying agent 14 with respect to functional safety, pressurized components, explosion protection, emissions, CE marking and further requirements. There is provision for subsequent extension by the addition of further smart contracts.

These operations are performed independently and autonomously.

A manufacturer 25 of products, for example of failsafe controls, publicly provides for its product types 26a, 26b, 26c standardized smart contracts 29a, 29b, 29c together with respective items of product documentations 30a, 30b, 30c, for example in an on-line catalog 31, which include documentation of suitability, such as for example a certificate of an inspector.

Certification of the product type 26a, 26b, 26c may already be realized here by a notified body 14 on the basis of the blockchain 3.

The smart contracts 29a, 29b, 29c allow automated verification of planning, implementation and supported repeatable tests in the course of conformity tracking.

Manufacturers of planning tools load these smart contracts 29a, 29b, 29c via a suitable interface as library components into their planning system 28, such as for example COMOS or Teamcenter.

First, safety-relevant properties, for example the previous certificate 20, are thus made available and the correct integration of the products in the planning system 28 or tools is ensured.

Although the product-specific certified smart contracts 29a, 29b, 29c are encrypted, the source code can be seen and can be verified by a checksum (not represented), such as for example a hash, even in the planning system 28 (or later during conformity tracking in the blockchain 3). This ensures transparency and auditability.

In the course of planning of a plant, integration of the products is performed in compliance with their specified properties by the plant builder 12. The planning system 28 ensures compliant use.

In the instantiation of the products for a specific plant, the assignment of a unique plant-related reference identification takes place in the planning system 28.

For the approval of a solution configured in the planning system 28, the configuration 32 of the products from the planning system 28 is then published in the conformity tracking. The configuration pre-tested by the planning system 28 may possibly be additionally tested by the notified body 14 and approved and also be provided with a certificate 33.

The associated smart contracts 29a, 29b, 29c have then reached the "approved planning" milestone and are consequently ready for confirmation of compliant realization.

The actual product/devices are of such a kind that they can then make the required realization code available by a readable key or by a suitable identifier. This may for example be a combination of suitability for the required safety integrity level (SIL level), the entity number/serial number, the manufacturer and the product type, which have also been transferred to the product in production. These codes are read out from the realized plant and transferred to the blockchain 3 for documentation. The smart contracts 29a, 29b, 29c check this and confirm conformity autonomously. A last check is possibly performed by the notified body 14.

Thus, a self-certifying and automated configuration management that ensures correct use of the products is provided.

Figure 6:
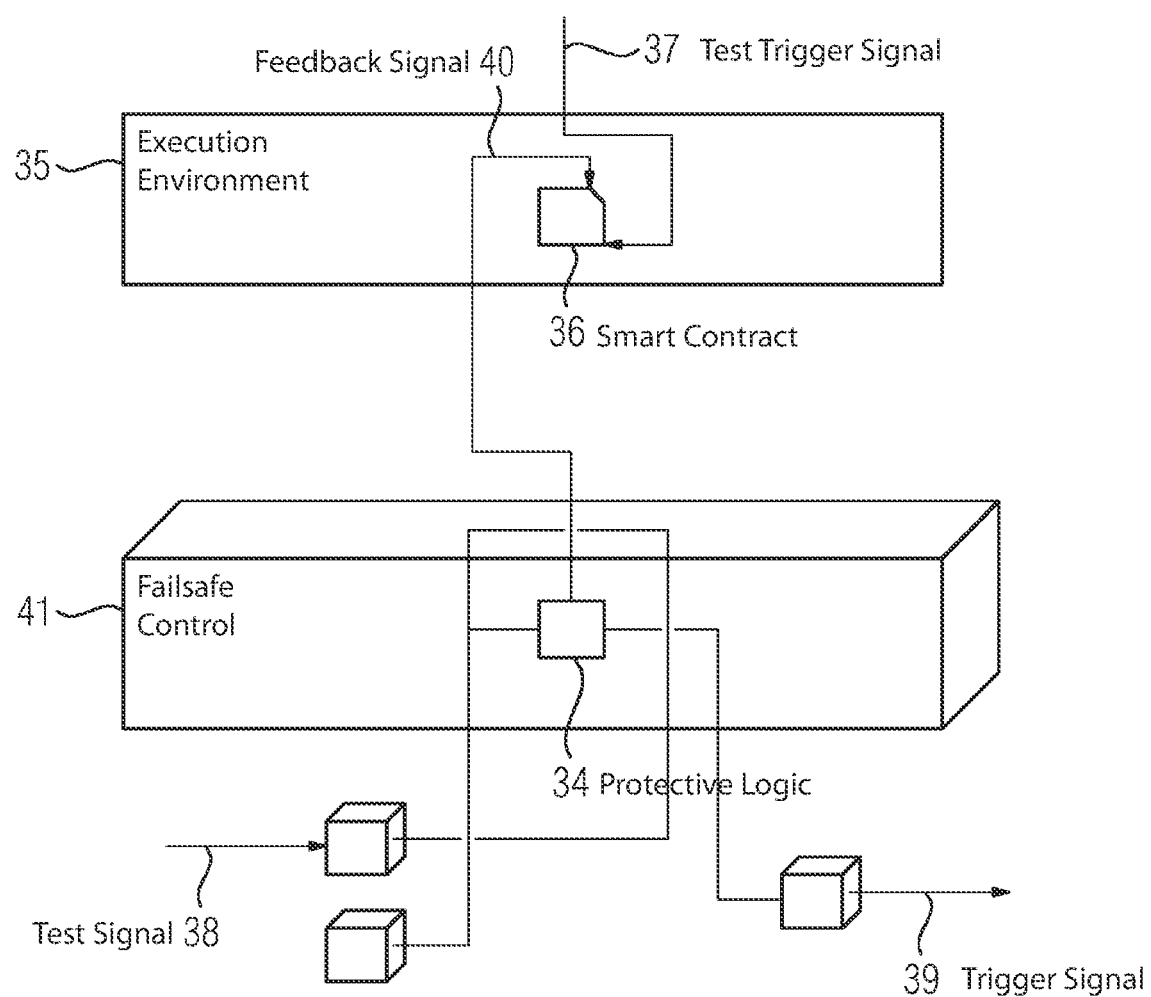
FIG. 6 shows a schematic representation of a method sequence for a functional test.
Figure 7:
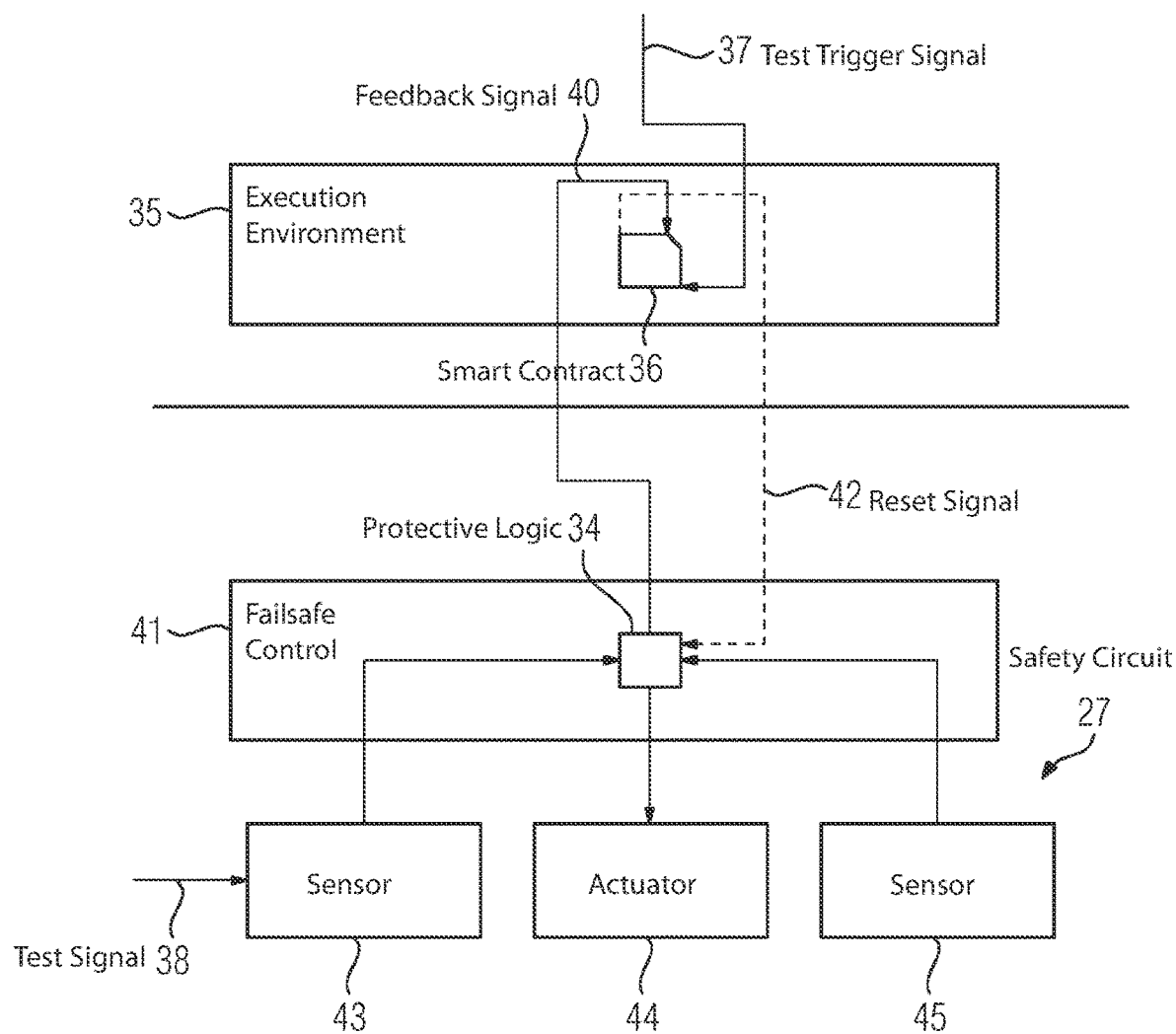
FIG. 7 shows a schematic representation of a further method sequence for a functional test.
Figure 8:
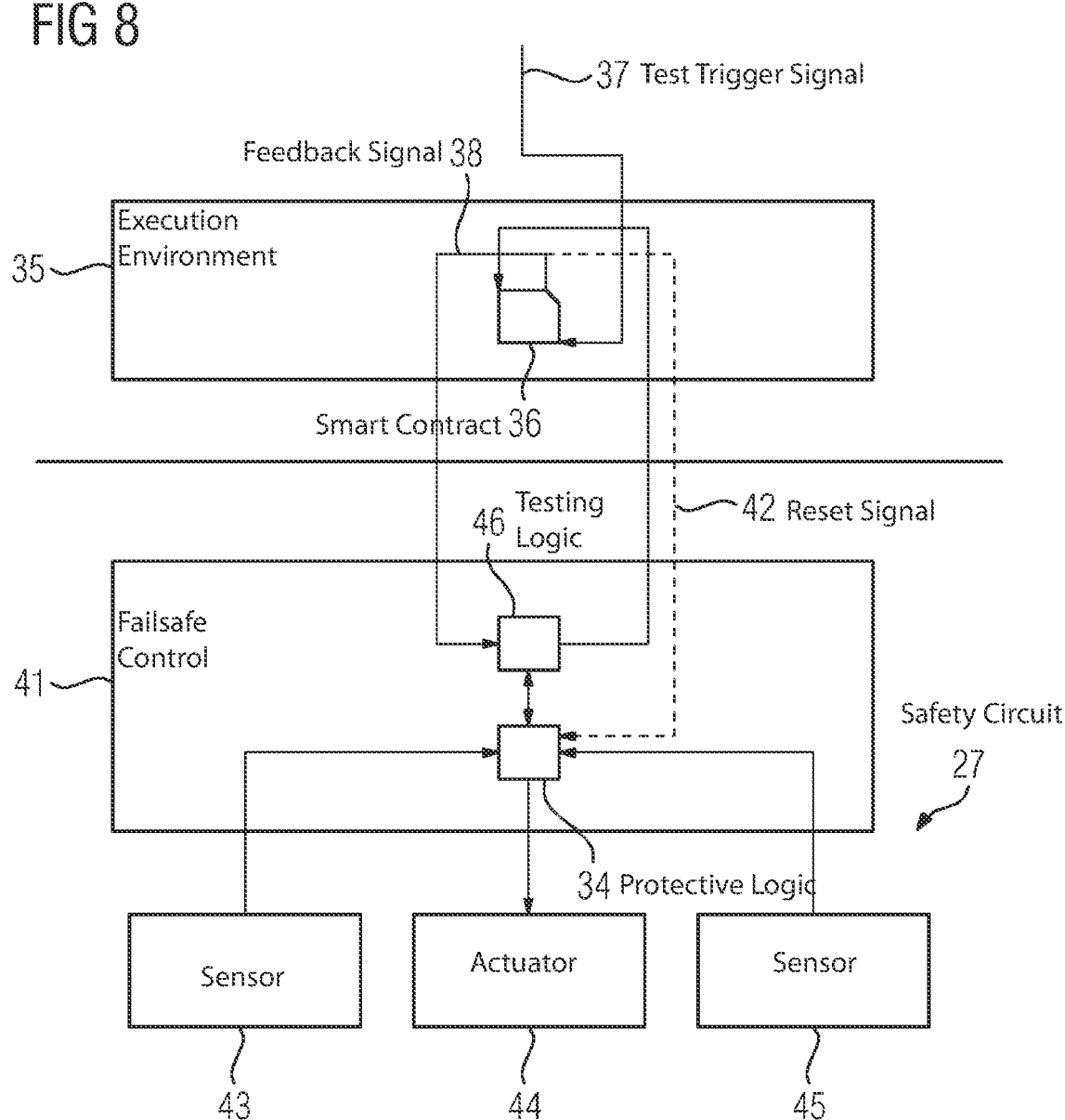
FIG. 8 shows a schematic representation of a further method sequence for a functional test

A method for functional testing is now explained with additional reference to FIGS. 6 to 8.

Reference is now initially made to FIG. 6.

A protective logic 34 of a failsafe control 41 and a blockchain 3 embedded in an execution environment 35 and also a smart contract 36 are represented.

During operation, a test trigger signal 37 triggers the smart contract 36, whereupon a test signal 38 is generated and is fed to the protective logic 34. As a result, a trigger signal 39 is available.

Furthermore, a feedback signal 40 for updating the blockchain 3 is generated.

In response to the feedback signal 40, the test result is archived in the blockchain 3.

Reference is now additionally made to FIG. 7.

The scenario represented in FIG. 7 differs from the scenario represented in FIG. 6 in that the test trigger signal 37 has to be manually provided in a time window predetermined by the smart contract 36 and acts on a sensor 43, such as for example an emergency-off switch, of a safety circuit 27. This provides monitoring for the safety circuit 27, which in the present exemplary embodiment additionally has an actuator 44, such as for example a servo drive of a steam valve, and a sensor 45, such as for example a sensor for sensing an end position.

In addition, a reset signal 42 is generated by the smart contract 36 for resetting the protective logic 34. With the reset signal 42, the protective logic 34 is brought back into the state that it had before the functional test.

Furthermore, a feedback signal 40 for updating the blockchain 3 is generated.

Reference is now additionally made to FIG. 8.

More sophisticated plants sometimes offer a prefabricated testing device, such as for example a testing logic 46, in order to be able to repeat this testing even during the operating time of the plant (usually when it is shut down).

The scenario represented in FIG. 8 differs from that in FIG. 7 in that the smart contract 36 itself provides the test signal 38 and feeds it to the testing logic 46 for the protective logic 34.

Thus, in the course of a functional test, the correct interaction of the individual components, such as for example sensors 43, 45, transferring, recording, protective logic 34, trigger signal 39, transferring and actuators 44, can be ensured. This takes place for the first time before acceptance testing.

A trigger signal 39 that can be documented in the blockchain 3, this functional testing and the logging of the signals and the devices involved allow successful and compliant functional testing also to be performed in an automated manner and registered or confirmed on the blockchain 3. This requires a suitable logic in the control system (master control system), a logic that is suitable for this purpose (generally validated and approved by the TUV).

Additionally required is a component of the failsafe control that can transmit events into the blockchain 3. This comprises the protection-triggering event (input), possibly states in the processing and the setting of the outputs.

These states are transferred with required meta data (automation device, timestamp, etc.) directly into the blockchain 3, so that an assessment and documentation of the result is possible. The transfer may take place for example in an encrypted form.

In combination with an active failsafe program code, which can be uniquely identified on the basis of the checksum 6a, 6b, 6c in the blockchain 3, full documentation of the operation is completely possible.

The checksum 6a, 6b, 6c is advantageously an own checksum and/or separate checksum, which for example has been respectively formed for a corresponding program code.

Alternatively or additionally, in combination with the documentation of the failsafe program code that is active at the time of testing and is secured against being changed for example in the protective system by a checksum of its own, full documentation of the operation can be completely achieved by adopting this checksum in the blockchain.

In order to cover the complete protective logic 34 (including physically), for example the closing of a valve, under some circumstances further measurements must also be included in the functional testing. This may be the stopping of a through-flow, the dropping of a pressure or the feedback indication of the end position of a fitting.

Since a failsafe part with so-called channel drivers forms the transition to the corresponding input and output card, the physical implementation of the entire failsafe system, including the input and output cards, cabling, bus system, field devices, cannot be automatically read out and documented without a new function in the control system. With the inclusion of intelligent field devices (HART, Profibus), at least it is possible for these areas to be included. For this purpose, the control system may example be able to read out encrypted identifications of the devices and document them in the blockchain 3 together with the test values of the failsafe control.

To the extent to which it is still required, the notified body 14 may then support the evaluation of the data available in the blockchain 3 and issue formal approval.

The operator 17 essentially still has responsibility for and overall management over working together (administration of the smart contracts 29a, 29b, 29c, authorization and allocation of roles) and instigation of the necessary measures.

The implementation of recurrent functional testing may be performed in the master control system of a power generating plant by the verified failsafe system. In this case, the master control system is programmed such that recurrent testing is initiated independently after an adjustable time or caused manually by a switching action of the authorized operator.

The successful test result (here for example testing the tripping of shutdown operation by an emergency-off button) is documented is a way secure from falsification with the aid of a smart contract 29a, 29b, 29c in the blockchain 3.

If the functional testing fails or is not initiated in the required testing interval, after the elapse of a correspondingly defined time the blockchain 3 can automatically interrupt operation of the plant (automatic running down) or trigger a corresponding official notification (cf. also IEC 61508-1 Chapter 6.2.5).

Another automatable function is the comparison of planning approved for implementation with actual implementation in the area of mechanical components, for example pressurized components.

The use of appropriate data formats, for example 3D data of implementation planning, allows an automatic comparison of the setpoint state and actual state (photographed or 3D scaled actual implementation) to initiate automated start-up approval. For this, a verified camera (verified=a camera product or software tested by the TUV for this purpose and approved) can be used on the basis of blockchain technology and provides forgery-proof photos in the blockchain 3.

Figure 9:
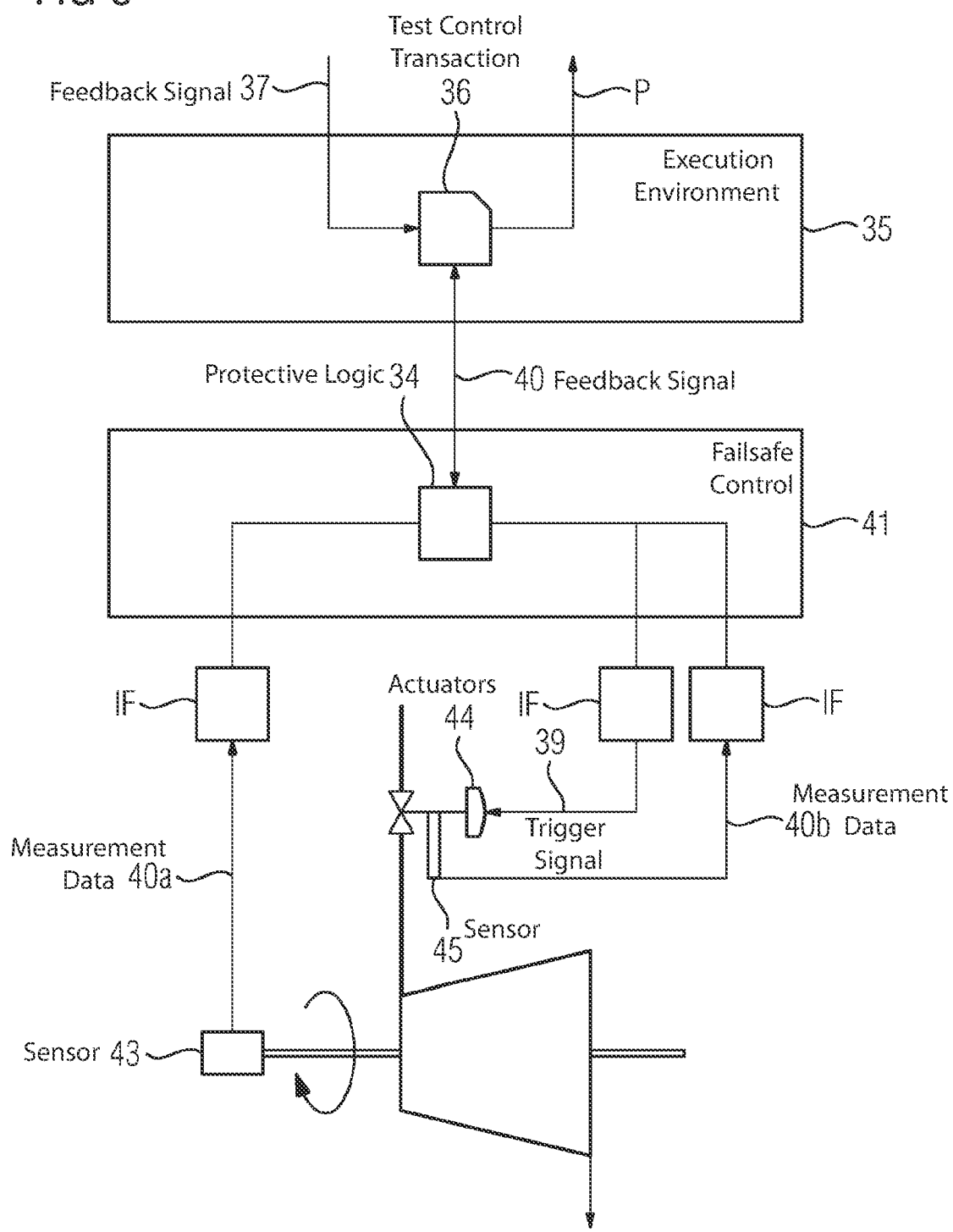
FIG. 9 shows a further exemplary embodiment of the invention.

A further exemplary embodiment is represented in FIGS. 9 and 10.

Specifically, a computer-implemented method and/or a system for testing a technical system is represented, wherein the method or the system is suitable in particular for conformity tracking of the technical plant. In this case, for example, a subsystem, for example an actuator (for example a pneumatic servo drive 44 of the quick-acting steam valve of the technical system) or a number of devices are tested, in order to establish whether they meet specified requirements. A device and/or a subsystem may for example be a protective circuit of the technical system and/or part of the protective circuit to be tested of the technical system and/or the protective logic 34.

The system comprises a test module (for example a test device) of a failsafe control 41 and an execution environment 35 in the form of a network application (for example a blockchain) and also a test control transaction 36, which is for example at least partly realized as a smart contract. The test module may for example be realized by the protective logic 34 or realized as a component of the network application or as a smart contract. Alternatively, the protective logic 34 may comprise the test module or correspond to the test module. Alternatively, the test module comprises the protective logic 34.

During operation, a test trigger signal 37 triggers the test control transaction 36. This may take place for example from a first entity AT1 via a data interface I. The entity AT1 may be for example a blockchain oracle, which provides a corresponding trigger or transfers it to the network application. Alternatively, the entity AT1 may also be a person, a test user or a piece of software for automated testing of the technical system.

The trigger may have been triggered for example by a sensor value that has exceeded a specified threshold value or may have been triggered on account of a time-based control. There may for example be a number of types of trigger, which perform different tests or inspections for a device of the plant. Correspondingly, the trigger codes which test is to be performed for which device. For example, the type and/or an extent of an admissible test is specified by a corresponding (authorized) entity (for example the notified body); the corresponding (authorized) entity can in this case specify for example the required trigger and/or corresponding reference data.

The test control transaction 36 comprises control commands and/or reference data in order to check a corresponding device of the technical system (for example a plant, a process plant, an automation system).

For example, a number of tests or inspections for a device may be coded/comprised in the test control transaction 36 or further test control transactions. For this purpose, a corresponding test control transaction comprises corresponding device-specific and/or test-specific control commands and/or reference data, wherein the corresponding device-specific and/or test-specific control commands and/or reference data are selected by the trigger. In other words, corresponding test control transactions may code device-specific and/or test-specific tests and/or inspections for devices of the technical system, wherein a selection of a corresponding test and/or inspection is made by data that the trigger comprises and/or codes.

The test control transaction 36 relevant for a test or an inspection is loaded by the trigger. This test control transaction 36 may in this case be loaded for example into the test module, or the network application or the test control transaction 36 or a smart contract generates a control signal. The network application and/or the test control transaction 36, the smart contract or the protective logic 34 and/or further components of the system shown in FIG. 9 can comprise the test module completely or partially, depending on for which component for example which function of the test module is implemented.

Depending on which of the components generates the signal and to which component the signal is transmitted, the control signal can be implemented differently. If for example the network application or the test control transaction 36 or the smart contract generates the control signal, the control signal may be realized as a test signal 38. If the protective logic 34 generates the control signal, the control signal may be realized as a trigger signal 39.

If for example a test signal 38 is generated, it is fed to the protective logic 34. As a result, then for example a trigger signal 39 is available.

The control signal generated in a test or in an inspection is in this case specific to a test or an inspection of a function of the devices involved in the protective circuit and/or of the devices integrated in the protective circuit themselves.

The protective circuit comprises the sensor 43 and/or 45, wherein the sensors 43 and/or 45 deliver measurement data 40a and 40b. The sensor 43 delivers for example measurement data from the process to be monitored, which for example may also be simulated for a corresponding test. The sensor 45 delivers for example measurement data that can be acquired as a reaction to the control signal (for example a test signal) and/or the commencement of the protective effect.

These measurement data 40a, 40b are in this case acquired by the test module, wherein the sensors 43, 45 are communicatively connected to the test module, for example via a bus or input and output assemblies IF, or the sensors 43, 45 transmit the measurement data 40a, 40b for example directly to the test module. For such data communication or further communication between the components of the system, the technical system, the network application, the system shown comprises a number of data interfaces IF, in order to realize a corresponding data interchange.

For example, with the trigger signal 39, the pneumatic servo drive 44 is actuated and the quick-acting steam valve is closed.

Alternatively or additionally, the trigger signal 39 or the control signal activates an entity by which the pneumatic servo drive 44 or the corresponding test can be implemented.

In a further variant, the test is carried out semiautomatically, in that the entity is a computer which indicates to a test user that the protective effect of the "overspeed" protective circuit is to be tested. For this purpose, the servo drive of the quick-acting valve is operated by the test user and is recorded by the sensor 45 (for example a position indicator).

Subsequently, a test result is determined on the basis of the measurement data and the corresponding reference data. This determination may be performed for example by the test module or the test control transaction 36. During this testing, it is for example determined whether the measurement data keep to, go below or go above the reference data. If the measurement data coincide with the reference data, a corresponding test or inspection is deemed to have been passed. If the measurement data deviate from the reference data, for example by an allowed tolerance value, a corresponding test or inspection can be assessed as past and stored in the test result. If for example the measurement data deviate from the reference data and/or exceed a corresponding tolerance value, a corresponding test or a corresponding inspection is deemed not to have been passed and is stored in the test result.

Dependent on the test result, the technical system is controlled and/or the device is controlled and/or a control function is performed. If for example the device complies with the specifications that are specified by the reference data, the technical system and/or the device is put into an operational state. In other words, if a test is passed, the technical system and/or the device is for example put into operation or an operating mode of the device or of the technical system is enabled for use by the control function or the approval enabling operation is extended by a further interval.

In variants of embodiments of the invention, it is also possible for a number of inspections or tests to be performed for the devices and/or further devices of the technical system and stored in the test result. Only when for example a specified number of inspections or tests (for example 100% of all inspections or tests or 80% of all tests) and/or specified specific tests or inspections (for example safety-critical tests must be passed 100%) have been completed is the technical system controlled and/or the device controlled and/or a control function performed. For example, only then is the technical system and/or the device put into an operating mode that allows its use (for example regular operational service). For example in the case of a power generating plant, this may be the enabling of control functions that allow starting up of the power plant, in order that it can also operate at full load or go into regular grid operation.

The measurement data 40a, 40b of the sensors 43, 45 may be for example a respective feedback signal. The measurement data 40a, 40b may code or comprise a corresponding feedback signal or be formed or realized as a corresponding feedback signal.

In variants, the measurement data 40a, 40b are acquired and used for updating the network application (for example the blockchain 35), in that for example the corresponding measurement data 40a, 40b are stored in a feedback signal 40 and transferred from the protective logic 34 or the test module to the test control transaction 36 or the network application. For this purpose, for example first the measurement data 40a, 40b may be transferred to the protective logic 34 or the test module. The protective logic 34 or the test module stores the measurement data 40a and/or the measurement data 40b and/or the test result in the feedback signal 40 and transfers them for example to the test control transaction 36 or the network application.

In the feedback signal 40 or the communication between the protective logic 34 and the test control transaction 36 and/or the network application, information accompanying a test (for example identification data and diagnostic data of the execution environment 41 of the protective logic) may also be included, for example for documentation and archiving.

In further variants, as a reaction to the measurement data 40a, 40b, the test result (which may also be referred to as the inspection result) is archived in the network application (for example the blockchain 3).

In further variants, for example the test result is stored in a confirmation transaction. Additionally or alternatively, for example the measurement data are stored in a measurement data transaction. Additionally or alternatively, for example the test result is calculated on the basis of the measurement data of the measurement data transaction. Additionally or alternatively, for example the confirmation transaction and/or the measurement data transaction and/or the test control transaction is/are secured by a respective proof-of-authority verification. Additionally or alternatively, for example the confirmation transaction and/or the measurement data transaction and/or test control transaction are stored in a respective data block. Additionally or alternatively, for example the respective data block comprises the respective proof-of-authority verification of the corresponding transaction.

The test result may for example be stored by a corresponding confirmation transaction and may for example be transmitted to a corresponding entity (for example a body to be notified or a trusted entity) as a message P or as the confirmation transaction (for example in step S13 or the data of step S13 from FIG. 10).

In a further variant, the system comprises a monitoring module, wherein the monitoring module is designed to store the activities of the system and/or of the test module in a log file or a data record or in transactions.

For example, embodiments of the invention can be used as follows. Since the time for renewed testing of the technical system (for example a power generating plant) as established by the TUV expires, a renewed successful functional test must be demonstrated.

A smart contract assigned to the protective circuit (for example the test control transaction 36) exists, and is able to process the requirements with respect to the trigger signal and protective effect, as well as time allowance and possibly coefficients (for example protective system without disruption) according to specifications of the certified body (TUV). For this purpose, the test control transaction 36 comprises the control commands and reference data necessary for this. In addition, the test control transaction 36 may comprise the test module or activate the test module.

In the initial state, the test control transaction 36 has not set the triggering of the protective logic (S1). The feedback indication of the protective logic to the smart contract is: protection not activated (S1a). The plant is therefore not blocked and is ready for a functional test.

Testing Procedure:

An authorized tester AT1, for example an employee of the certified body or a piece of test software, activates the test mode (test trigger signal 37) via the data interface I (for example a web interface).

The smart contract active for overspeed protection (may also be referred to as program code, program commands or chain code) of the test control transaction 36 activates a timer (for example 30-minute test window) and waits for the feedback indication that the protection has been activated ("speed>X" measurement data 40a of the sensor 43) and the protective effect has started ("quick-acting valve feedback closed" measurement data 40b of the sensor 45). For this purpose, for example the smart contract or the test control transaction 36 with the smart contract may be implemented and the test module activated as above.

In addition, the smart contract and/or the test control transaction 36 and/or the test module checks on the basis of the timestamps of the measurement data 40a, 40b whether the reaction was achieved within the reference data, that is to say the specified reference time (for example 10 seconds).

For example, a further entity AT2 (for example a person, an activated device or a software component) may trigger the protection by actually generating the critical process state when the plant is shut down or by simulation at the sensor 43 (S2).

The trigger signal (S3) registered in the protective logic 34 is transferred to the smart contract and/or the test control transaction 36 and/or the test module (S4). The protective logic 34 responds and triggers the protective command (S5 command "CLOSED" signal 39).—The valve is therefore intended to be closed/in a closed state, in order to lower the speed of the turbine, in that the protective command is transferred to the actuating element 44 (for example to the servo drive of the quick-acting steam valve) (S5). In addition, the protective logic transfers the activated trigger (S6) to the test control transaction 34. The quick-acting steam valve closes and the position indicator 45 indicates "CLOSED" (S7=measurement data 40b) back to the control logic and/or the test control transaction 36 and/or the test module (S8). The feedback indication as to whether a safe state has been called for and achieved is therefore sensed by the sensors 43, 45 and recorded by the corresponding measurement data 40a, 40b. Dependent on the chosen implementation, this may for example also be transferred to the smart contract and/or the test control transaction 36 and/or the test module. The smart contract and/or the test control transaction 36 and/or the test module then calculate the test result with the inclusion of the reference data.

Checking or calculating may yield the following results, which are stored in the test result and/or control the technical system dependent on the test result and/or perform a control function:

Successful:

If triggering (measurement data 40a) and the protective effect (measurement data 40b) change in the correct sequence from 0 to 1 within the specified reference time (for example 20 seconds), the documentation (with timestamps) of a successful test (S13) takes place—in other words, the measurement data 40a, 40b demonstrate compliance with the specifications (reference data). This evaluation is performed by the test module.

The approval enabling functioning of the protective circuit by the smart contract and/or the test control transaction 36 and/or the test module is retained until the next recurrent testing. For this purpose, the approval is set in the protective logic (S9). This is controlled by performing the control function dependent on the test result.

Test not Completed:

If the time of the test window (for example 30 minutes) has elapsed and no trigger signal (38 or 40a) is registered in the smart contracts and/or in the test control transaction 36 and/or in the test module (S4), the documentation of a missed test takes place (for example by generating or storing corresponding transactions in the network application) (S13). The testing can for example be repeated (37). If for example notification of a successful test is not provided on the basis of the smart contract and/or the test control transaction 36 and/or the test module in time (for example a specified time period for registering a successful test is exceeded) (S10), a further entity AT3 (for example a certified body) receives a corresponding message and becomes active (S13). If the repeated test is successful, the further entity is informed about this repeated successful test (S13). This may take place and/or be documented for example by corresponding transactions of the network application. The further entity AT3 may for example be software or a person of a certifying body, which possibly dependent on the test result controls the technical system and/or performs or approves a control function for the technical system.

Test not Successful:

If the test is not correctly completed, one measure may be that the protective command remains permanently triggered by the smart contract, so that the quick-acting valve can no longer move to OPEN. This may be realized for example by performing the control function dependent on the test result (S10), which enforces the protective effect (quick-acting valve command "CLOSED"). Consequently, for example, the plant is blocked by the protective logic 34. The state is for example transmitted to the test control transaction 36 and/or the test module (S12) and documented or monitored there.

Thus, for example for cancelling the protective command (S11) by a resetting mechanism, the plant can be approved to operate again in the smart contract and/or in the protective logic and/or in the test control transaction 36 and/or the test module.

Since the message of an unsuccessful test is stored in the blockchain and transferred to the parties responsible (for example the entity AT3), searching for and correcting errors can be carried out under supervision.

The smart contract and/or the test control transaction 36 and/or the test module may for example be configured such that the resetting in the smart contract and/or in the test control transaction 36 and/or in the test module is only possible by the assigned authority or by the certified body (for example the further entity AT3) (key management and authorization in the blockchain). This may take place and/or be documented for example by corresponding transactions of the network application.

In a further variant, the sensor 43 and/or the sensor 45 comprises a processor or a microcontroller, in order to generate simulated sensor data 40a, 40b and test the technical system, the device or a reaction of the technical system or of the device to simulated sensor data 40a, 40b. A sensor with a processor or microcontroller may also be referred to for example as an intelligent sensor. In other words, this variant relates for example to a computer-implemented method, wherein a test signal 38 or a control signal is provided by the smart contract and/or the test control transaction 36 and/or the test module, wherein the test control transaction 36 and/or the test module comprises the smart contract.

The test signal or control signal is for example generated by the smart contract itself. There is therefore no need for any further intervention, in order for example to trigger a test signal manually. Rather, the test signal is generated automatically.

For example, the sensor 43 may have been replaced by a sensor 43 of an intelligent design, such as for example an intelligent pressure gage with a simulation function. Consequently, for example the safety circuit 27 can be monitored, in the present exemplary embodiment additionally comprising an actuator, such as for example a quick-acting steam valve, and having a sensor 45, such as for example a sensor for sensing an end position.

In a further embodiment, the test is automatically triggered by the smart contract:

In a suitable state of the technical system (for example shut-down), which is signaled to the smart contract from the protective logic, a test trigger signal 37 triggers the smart contract 36 automatically. By the smart contract or the test control transaction, the protective logic and/or the test module is activated in such a way that as a result a test signal 38 is generated. This then possibly has the effect that the protection is triggered on the basis of the protective logic 34. The successful protective effect is registered in the protective logic and/or the test module and in response for example the corresponding measurement data are stored in the network application (for example the blockchain).

Functional testing for overspeed protection with automatic triggering by the intelligent sensors can be realized as follows:

Initial State:

Since the time for renewed testing as established by the TUV expires, a renewed successful functional test must be demonstrated.

A smart contract assigned to the protective circuit or the device exists, and is able to process the requirements with respect to the trigger signal and protective effect, as well as time allowance and possibly coefficients (for example protective system without disruption and technical system when shut down) according to specifications of the certified body (TUV). This is coded in the reference data and control commands of the test control transaction. Correspondingly, the test control transaction may comprise the smart contract or correspond to it.

In the initial state, the smart contract has not set the triggering of the protective logic or the device. The feedback indication of the protective logic to the smart contract is: protection not activated. The plant is therefore not blocked and is ready for a functional test.

Testing Procedure:

An authorized tester, for example an employee of the certified body (for example the entity AT1), activates the test mode with the corresponding signal 37 via the data interface I (for example a communication interface).

The smart contract triggers—for example on the basis of the protective logic—a simulation 38 in the sensor 45 (for example in the form of an intelligent sensor) for triggering protection and at the same time sets a timer (for example a time window of 10 minutes), which monitors the testing procedure and withdraws the simulation after the elapse of a defined time or after the end of the test. The sensor 45 then delivers measurement data that simulate the inadmissible state of the process to the protective logic and/or the test module. The protective logic reacts to these simulated measurement data and the reaction of the protective system to these simulated measurement data is monitored as described.

The smart contract consequently then monitors on the basis of the feedback indication as to whether the protection has been activated ("speed>X" signal 40a) and the protective effect has commenced ("quick-acting valve feedback closed" signal 40b).

In addition, the smart contract checks on the basis of the timestamps of the signals whether the reaction was achieved within the specified time.

For example, the trigger signal 39 brought about in the protective logic is also transferred to the smart contract. The protective logic responds and triggers the protective command (command CLOSED 39). The quick-acting steam valve closes and reports "CLOSED" (signal 40b) back to the protective logic. This is also transferred to the smart contract.

Successful:

If triggering (40*a*) and the protective effect (40*b*) change in the correct sequence from 0 to 1 within the specified time, the documentation (with timestamps) of a successful test takes place. The smart contract sets the approval enabling functioning of the protective circuit. The simulation in the functional logic is disabled.

For example, an electrical measured value may be produced for a simulation in the sensor or in the test module (HART simulation). The speed of the turbine is in this case=0. The indicator or the corresponding sensor then however gives for example 12 mA or for example 10 000 rpm and this triggers the protection or a corresponding safety function.

The approval enabling functioning of the protective circuit by the smart contract 36 is retained until the next recurrent testing.

Test not Successful:

If the cause and effect are not achieved in the correct sequence and time interval or if the time of the test window (10 minutes) has elapsed and no trigger signal 40*a* is registered in the smart contract, there is an error, since for example the simulation has not been activated. These corresponding specifications may be stored for example in the reference data.

One measure may be that the protective command is permanently triggered by the smart contract, so that the quick-acting valve can no longer move to OPEN. After the error has been rectified, the plant must be approved to operate again by a resetting mechanism in the smart contract and/or in the protective logic.

Since the message of an unsuccessful test is stored in the blockchain and transferred to the parties responsible, searching for and correcting errors can be carried out under supervision.

The smart contract may be configured such that the resetting in the smart contract is only possible by the assigned authority or by the certified body (key management and authorization in the blockchain).

Further embodiments are presented below:

A device or a system for testing a/the technical system, in particular for conformity tracking, having:
  for example a loading module, wherein
    for example the loading module is designed for loading and/or performing a test control transaction,
    for example the test control transaction is loaded from a network application,
    for example the test control transaction comprises control commands and reference data;
  for example a test module, wherein
    for example the test module is designed to be controlled by the control commands,
    for example the control commands activate the test module in such a way that a test signal for a subsystem of the technical system is generated;
  for example an acquisition module, wherein
    for example the acquisition module is designed for acquiring measurement data for the subsystem as a reaction to the test signal,
    for example the measurement data are acquired by the test module,
    for example the measurement data are acquired by a sensor of the test module;
    for example the acquisition module is the sensor;
  for example a calculation module, wherein for example the calculation module is designed for calculating a test result on the basis of the measurement data and the reference data;
  for example a control module, wherein for example the control module is designed for controlling the technical system dependent on the test result and/or performing a control function dependent on the test result.

The loading module and/or the test module and/or the calculation module and/or the control module may be realized for example as separate hardware and/or software modules. Alternatively or additionally, these modules are in the form of a smart contract and may be completely or partially realized for example by the protective logic and/or the test control transaction.

In a further variant, the acquisition module is formed by the sensors 43, 45.

In a further variant, the calculation module and/or the control module is formed by the test module and/or the protective logic (explained in previous exemplary embodiments).

In a further variant, the loading module is realized by the test module and/or the network application (explained in previous exemplary embodiments).

In a further variant the system or the device comprises a monitoring module, wherein the monitoring module is designed to store the activities of the system and/or of the test module in a log file or a data record or in transactions.

The device or the system (or else the other exemplary embodiments and variants) may for example additionally also comprise a further component or a number of further components, such as for example a processor, a memory unit, further communication interfaces (for example Ethernet, WLAN, USP, fieldbus, PCI), an input device, in particular a computer keyboard or a computer mouse, and a display device (for example a monitor). The processor may for example comprise a number of further processors, which may in particular be used for realizing further exemplary embodiments.

A further exemplary embodiment relates to a computer-implemented method for providing data, in particular for conformity tracking, in a distributed peer-to-peer network, having the steps of:
  providing at least one first data block (4*a*), in particular having data representative of the conformity tracking, for generating a blockchain (3) having a first checksum (6*a*) by a first entity (5*a*) of the peer-to-peer network (1),
  providing at least one proof-of-authority verification (10) for verifying a further data block (4*b*, 4*c*),
  generating the further data block (4*b*, 4*c*) representative of conformity tracking having a further checksum (6*b*, 6*c*) and at least the first checksum (6*a*) by a further entity (5*b*, 5*c*) of the peer-to-peer network (1),
  checking the proof-of-authority verification (10),
  adding the further data block (4*b*, 4*c*) to the first data block (4*a*) in the event of a successful check on the proof-of-authority verification (10) in order to form the blockchain (3), and
  providing the blockchain (3) in the distributed peer-to-peer network (1),
  wherein one of the data blocks (4*a*, 4*b*, 4*c*) takes the form of a smart contract (36, 29*a*, 29*b*, 29*c*) that responds to the presence of a predetermined case of error by providing an error handling measure and/or responds to the presence of a test trigger signal (37) by triggering a functional test.

In a variant of the embodiment, in the computer-implemented method the test trigger signal (37) calls for a test signal (38).

In a variant of the embodiment, the test signal (38) is provided by the smart contract (36, 29a, 29b, 29c).

In a variant of the embodiment, the smart contract (36, 29a, 29b, 29c) provides a reset signal (42).

In a variant of the embodiment, the smart contract (29a, 29b, 29c) provides a feedback signal (40).

In a variant of the embodiment, the peer-to-peer network (1) is a private network.

In a variant of the embodiment, the proof-of-authority verification (10) has at least a time-limited validity period.

In a variant of the embodiment, the proof-of-authority verification (10) has at least a content-related validity.

In a variant of the embodiment, the proof-of-authority verification (10) has at least at least a user-related validity.

In a variant of the embodiment, a data block (4a, 4b, 4c) takes the form of a smart contract, wherein the smart contract responds to the presence of a predetermined condition by providing a proof-of-authority verification (10).

In a variant of the embodiment, a healing function is provided, for altering and/or marking at least one of the data blocks (4a, 4b, 4c).

A further embodiment relates to a system for providing data, wherein the system comprises means for performing the steps of the method according to the aforementioned embodiment and/or one of its variants.

A further embodiment relates to a computer program product, comprising commands which, when the program is executed by a computer, cause it to perform at least one of the steps of the embodiment and/or one of its variants, wherein the computer is assigned to the first entity (5a).

A further embodiment relates to a computer program product, comprising commands which, when the program is executed by a computer, cause it to perform at least one of the steps of the embodiment and/or one of its variants, wherein the computer is assigned to one of the further entities (5b, 5c).

A further embodiment relates to a computer program product, comprising commands which, when the program is executed by a computer, cause it to perform at least one of the steps of the embodiment and/or one of its variants of a smart contract (29a, 29b, 29c).

By scanning or photographing and image processing, a large number of features can be recorded (material identifications, production marks, etc.), which realizes testing/inspection or certification automated with smart contracts 29a, 29b, 29c.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A computer-implemented method for testing a technical system for conformity tracking in a distributed network, the method comprising:
loading or performing a test control transaction, wherein the test control transaction comprises control commands and reference data, wherein the test control transaction comprises a smart contract;
controlling a test module, wherein the control commands activate the test module in such a way that a test signal for a subsystem of the technical system is generated automatically according to the smart contract;
acquiring measurement data for the subsystem as a reaction to the test signal using at least one sensor, wherein the measurement data is acquired by the test module;
calculating a test result on the basis of the measurement data and the reference data;
storing the test result in a confirmation transaction or the measurement data in a measurement data transaction;
controlling the technical system dependent on the test result or performing a control function dependent on the test result, wherein the step of controlling the technical system or performing a control function comprises putting the technical system into operation, enabling an operating mode of the technical system, or extending an approval enabling operation when the test result is positive, wherein the step of controlling the technical system or performing a control function comprises shutting down the technical system when the test result is negative, wherein at least one of
the test result is calculated on the basis of the measurement data of the measurement data transaction,
the confirmation transaction, the measurement data transaction or the test control transaction is secured by a respective proof-of-authority verification,
the confirmation transaction, the measurement data transaction or test control transaction is stored in a respective data block,
additional/meta data for testing is stored in a confirmation transaction, and
the respective data block comprises the respective proof-of-authority verification of the corresponding transaction, thereby allowing addition of the respective data block.

2. The computer-implemented method as claimed in claim 1, wherein a test trigger signal calls for the loading or performing of the test control transaction.

3. The computer-implemented method as claimed in claim 1, wherein the confirmation transaction or the measurement data transaction is stored in a respective data block of a distributed database of the distributed network.

4. The computer-implemented method as claimed in claim 1, wherein, dependent on the test result, a reset signal for the subsystem is provided or the control function provides a reset signal for the subsystem dependent on the test result.

5. The computer-implemented method as claimed in claim 1, wherein, dependent on the test result, a feedback signal for the subsystem is provided or the control function provides a feedback signal for the subsystem dependent on the test result.

6. The computer-implemented method as claimed in claim 1, wherein the test control transaction is loaded from a network application, and wherein the network application is performed in or by the distributed network.

7. The computer-implemented method as claimed in claim 1, wherein the proof-of-authority verification has at least a time-limited validity period.

8. The computer-implemented method as claimed in claim 1, wherein the proof-of-authority verification has at least a content-related validity.

9. The computer-implemented method as claimed in claim 1, wherein the proof-of-authority verification has at least a user-related validity.

10. The computer-implemented method as claimed in claim 1, wherein the respective data block takes the form of a smart contract that responds to the presence of a predetermined condition by providing the proof-of-authority verification.

11. The computer-implemented method as claimed in claim 1, wherein a healing function is provided for altering or marking at least one of the data blocks.

12. A computer program product, comprising a non-transitory computer readable storage device having computer readable program code stored therein, said program code executable by a processor of a computer system to implement the method of claim 1.

13. A computer program product, comprising commands which, when the program is executed by a computer, cause it to perform the steps of claim 1.

14. A device for testing a technical system, for conformity tracking in a distributed network, comprising:
  a loading module, wherein
    the loading module is designed for loading and/or or performing a test control transaction, wherein the test control transaction includes control commands and reference data, and wherein the test control transaction comprises a smart contract;
  a test module, wherein
    the test module is designed to be controlled by the control commands, the control commands activate the test module in such a way that a test signal for a subsystem of the technical system is generated automatically according to the smart contract;
  an acquisition module, wherein
    the acquisition module is designed for acquiring measurement data for the subsystem as a reaction to the test signal using at least one sensor,
    wherein the measurement data is acquired by the test module,
  a calculation module, wherein the calculation module is designed for calculating a test result on the basis of the measurement data and the reference data; and
  a control module, wherein the control module is designed for controlling the technical system dependent on the test result or performing a control function dependent on the test result, wherein the control module stores the test result in a confirmation transaction or the measurement data in a measurement data transaction, wherein controlling the technical system or performing a control function comprises putting the technical system into operation, enabling an operating mode of the technical system, or extending an approval enabling operation when the test result is positive, wherein the step of controlling the technical system or performing a control function comprises shutting down the technical system when the test result is negative,
  wherein at least one of
    the test result is calculated on the basis of the measurement data of the measurement data transaction,
    the confirmation transaction, the measurement data transaction or the test control transaction is secured by a respective proof-of-authority verification,
    the confirmation transaction, the measurement data transaction or test control transaction is stored in a respective data block,
    additional/meta data for testing is stored in a confirmation transaction, and
      the respective data block comprises the respective proof-of-authority verification of the corresponding transaction, thereby allowing addition of the respective data block.

15. A computer-implemented method for testing a technical system for conformity tracking, the method comprising:
  loading or performing a test control transaction, wherein the test control transaction comprises control commands and reference data, wherein the test control transaction comprises a smart contract;
  controlling a test module according to the smart contract, wherein the control commands activate the test module in such a way that a test signal for a subsystem of the technical system is generated;
  acquiring measurement data for the subsystem as a reaction to the test signal using at least one sensor, wherein the measurement data is acquired by the test module;
  calculating a test result on the basis of the measurement data and the reference data; and
  controlling the technical system dependent on the test result or performing a control function dependent on the test result;
  wherein the test result is stored in a confirmation transaction; the measurement data is stored in a measurement data transaction; the test result is calculated on the basis of the measurement data of the measurement data transaction; the confirmation transaction, the measurement data transaction or test control transaction is secured by a respective proof-of-authority verification; the confirmation transaction, the measurement data transaction or test control transaction is stored in a respective data block; additional/meta data for testing is stored in a confirmation transaction; wherein the respective data block comprises the respective proof-of-authority verification of the corresponding transaction, thereby allowing addition of the respective data block;
  wherein the step of controlling the technical system or performing a control function comprises putting the technical system into operation, enabling an operating mode of the technical system, or extending an approval enabling operation when the test result is positive; and wherein the step of controlling the technical system or performing a control function comprises shutting down the technical system when the test result is negative.

\* \* \* \* \*